(12) United States Patent
Ichikawa et al.

(10) Patent No.: US 7,783,212 B2
(45) Date of Patent: Aug. 24, 2010

(54) THICKNESS VARIATION DETECTOR OF PHOTOCONDUCTOR, IMAGE FORMATION UNIT, IMAGE FORMATION APPARATUS AND METHOD FOR THICKNESS VARIATION OF PHOTOCONDUCTOR

(75) Inventors: Junichi Ichikawa, Kanagawa (JP); Kenji Ogi, Kanagawa (JP); Masao Ito, Kanagawa (JP); Tomoshi Hara, Kanagawa (JP); Kenji Hara, Kanagawa (JP); Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 423 days.

(21) Appl. No.: 11/822,811

(22) Filed: Jul. 10, 2007

(65) Prior Publication Data

US 2008/0122460 A1 May 29, 2008

(30) Foreign Application Priority Data

Nov. 27, 2006 (JP) .......................... P.2006-318287

(51) Int. Cl.
*G03G 15/00* (2006.01)
*G03G 15/043* (2006.01)

(52) U.S. Cl. .............................. 399/48; 399/26; 399/51

(58) Field of Classification Search .................... 399/26, 399/46, 48, 50, 51, 159; 324/699
See application file for complete search history.

(56) References Cited

U.S. PATENT DOCUMENTS

| 5,636,009 A * | 6/1997 | Honda et al. ................... 399/50 |
| 6,421,508 B2 * | 7/2002 | Inoue et al. ................ 399/50 X |
| 6,738,585 B2 * | 5/2004 | Shin et al. ...................... 399/26 |
| 6,738,586 B2 * | 5/2004 | Kubota et al. .................. 399/48 |
| 7,013,095 B2 * | 3/2006 | Ishida ........................ 399/26 X |

FOREIGN PATENT DOCUMENTS

| JP | A-5-72872 | 3/1993 |
| JP | 11-15214 | 1/1999 |
| JP | 2000-162834 | 6/2000 |
| JP | 2005-81581 | 3/2005 |

* cited by examiner

*Primary Examiner*—Sandra L Brase
(74) *Attorney, Agent, or Firm*—Morgan, Lewis & Bockius LLP

(57) ABSTRACT

A thickness variation detector of a photoconductor includes: a current detection unit that detects a value of current being used for charging a surface of the photoconductor in a state in which a charging unit is in contact with a surface of the photoconductor; and a thickness variation detection unit that detects a thickness variation along a rotation direction of the photoconductor based on the value of current.

11 Claims, 17 Drawing Sheets

THICKNESS VARIATION DETECTOR OF PHOTOCONDUCTOR, IMAGE FORMATION UNIT, IMAGE FORMATION APPARATUS AND METHOD FOR THICKNESS VARIATION OF PHOTOCONDUCTOR

CROSS-REFERENCE TO RELATED APPLICATION

This application is based on and claims priority under 35 USC §119 from Japanese Patent Application No. 2006-318287 filed Nov. 27, 2006.

BACKGROUND (i) Technical Field

This invention relates to a thickness variation detector of a photoconductor, an image formation unit using the thickness variation detector, an image formation apparatus, a method for detecting a thickness variation of a photoconductor.

(ii) Related Art

Hitherto, an image formation apparatus of a printer, a copier, a facsimile, etc., adopting electrophotography has been configured as follows: After the surface of a photoconductor drum is charged to a potential by a charging roll, image light exposure is applied to the surface of the photoconductor drum to form an electrostatic latent image responsive to image information, the electrostatic latent image formed on the surface of the photoconductor drum is visualized by a developing unit to form a toner image, and the toner image formed on the photoconductor drum is transferred directly onto a record paper and then is fixed, thereby forming an image or is transferred onto the record paper through an intermediate transfer body and then is fixed, thereby forming an image.

In such an image formation apparatus, when a photosensitive layer is formed on the surface of the photoconductor drum shaped like a drum or a belt, it is practically difficult to uniformly form a layer over the full face of the photoconductor and when an image is formed, it is difficult to provide a uniform toner image along the circumferential direction of the photoconductor.

SUMMARY

According to an aspect of the invention, there is provided a thickness variation detector of a photoconductor including:

a current detection unit that detects a value of current being used for charging a surface of the photoconductor in a state in which a charging unit is in contact with a surface of the photoconductor; and a thickness variation detection unit that detects a thickness variation along a rotation direction of the photoconductor based on the value of current.

BRIEF DESCRIPTION OF THE DRAWINGS

Embodiments of the present invention will be described in detail based on the following figures, wherein.

DETAILED DESCRIPTION

Referring now to the accompanying drawings, there are shown exemplary embodiments of the invention.

First Exemplary Embodiment

Figure 2:
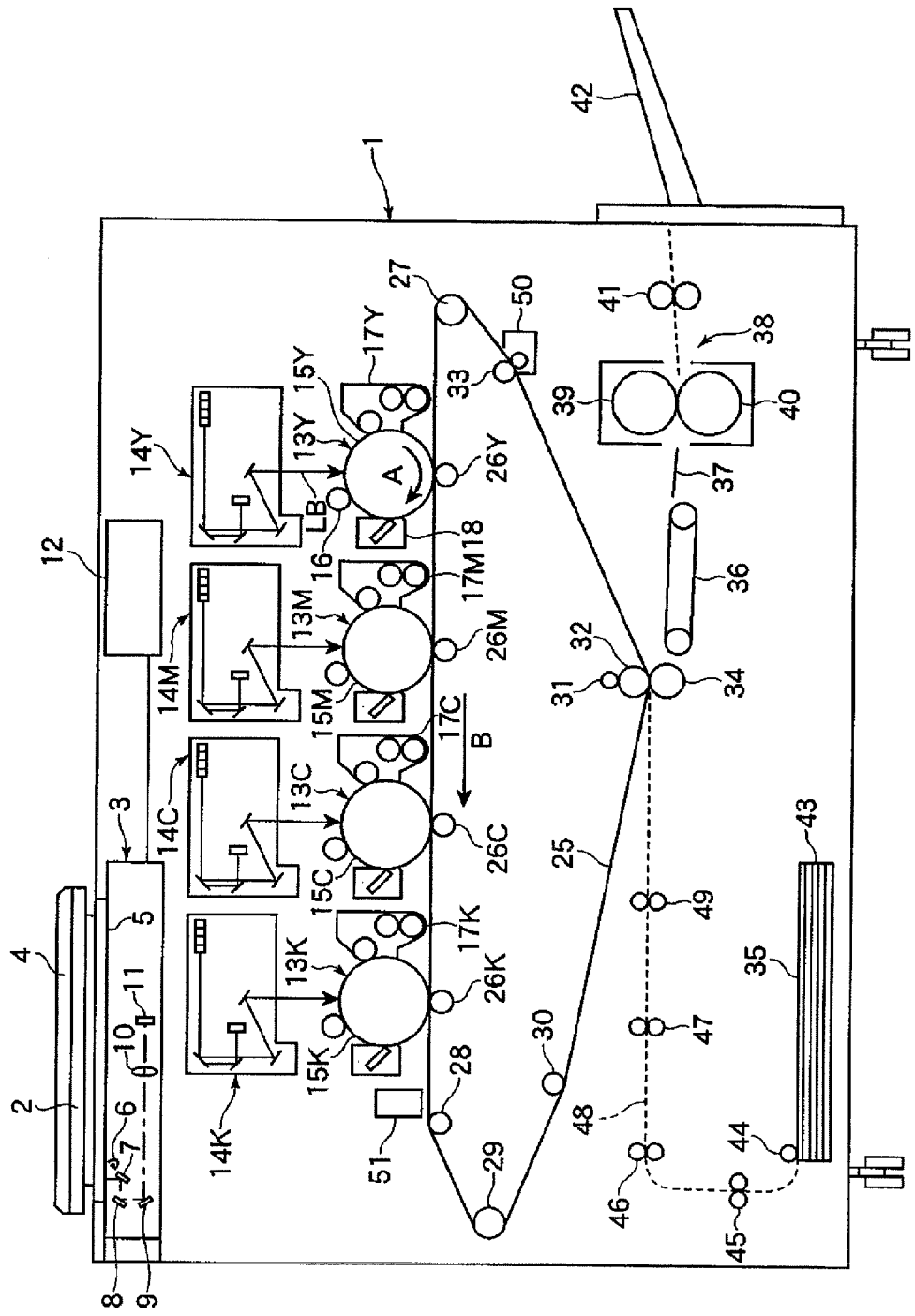
FIG. 2 is a drawing to show the configuration of the tandem full-color printer as the image formation apparatus incorporating the thickness variation detection unit of the photoconductor and the image formation unit according to the first embodiment of the invention.

FIG. 2 shows a tandem full-color printer as an image formation apparatus incorporating a thickness variation detection unit of a photoconductor and an image formation unit according to a first exemplary embodiment of the invention.

The tandem color printer includes an image reader and also functions as a full-color copier. The full-color printer may include no image reader, of course.

In FIG. 2, numeral 1 denotes the main body of the tandem full-color printer. An image reader (IIT: Image Input Terminal) 3 for reading an image of an original document 2 is disposed in the upper part of one end side (in the figure, the left) of the full-color printer main body 1. The image reader 3 uses a light source 6 to illuminate an original document 2 placed on platen glass 5 in a pressed state by a platen cover 4 by an automatic original transporter (ADF: Automatic Document Feeder) not shown for automatically transporting an original document or the like, scans a reflected light image from the original document 2 over an image read element 11 of CCD, etc., through a reduction optical system made up of a full rate mirror 7, half rate mirrors 8 and 9, and an image formation lens 10, and reads the image of the original document 2 by the image read element 11 at a dot density (for example, 400 dpi or 600 dpi).

The image of the original document 2 read by the image reader 3 is sent to an image processing apparatus 12 (IPS: Image Processing System) for performing image processing for image data of three colors of red (R), green (G), and blue (B), for example, and the image processing apparatus 12 performs image processing of shading correction, position shift correction, lightness/color space conversion, gamma correction, frame removal, color/move edit etc., for the image data of the original document 2.

The image data subjected to the image processing by the image processing apparatus 12 as described above is converted into image data of four colors of yellow (Y), magenta (M), cyan (C), and black (K) (each eight bits) by the image processing apparatus 12 and the image data is sent to an exposing apparatus ROS (Raster Output Scanners) 14, including 14Y, 14M, 14C, and 14K, which are image exposing units of color image formation units 13Y, 13M, 13C, and 13K of yellow (Y), magenta (M), cyan (C), and black (K). The ROSs 14Y, 14M, 14C, and 14K execute image exposure using a laser beam LB in response to the image data of each color as described below.

By the way, the four image formation units 13Y, 13M, 13C, and 13K of yellow (Y), magenta (M), cyan (C), and black (K) are placed in series with a given spacing in the horizontal direction in the tandem full-color printer main body 1.

The four image formation units 13Y, 13M, 13C, and 13K are configured in a similar manner except the color of the image to be formed. Each is roughly made up of a photoconductor drum 15 as a photoconductor driven at a rotation speed along the arrow A direction, a charging roll 16 as a contact charging unit for uniformly charging the surface of the photoconductor drum 15, the above-mentioned ROS 14 for exposing an image corresponding to each color to form a latent image on the surface of the photoconductor drum 15, a developing unit 17 for developing the latent image formed on the photoconductor drum 15 in toner of the corresponding color, and a cleaning unit 18. The image formation units 13Y, 13M, 13C, and 13K can be separately attached to and detached from the full-color printer main body 1 except the ROS 14.

Figure 3:
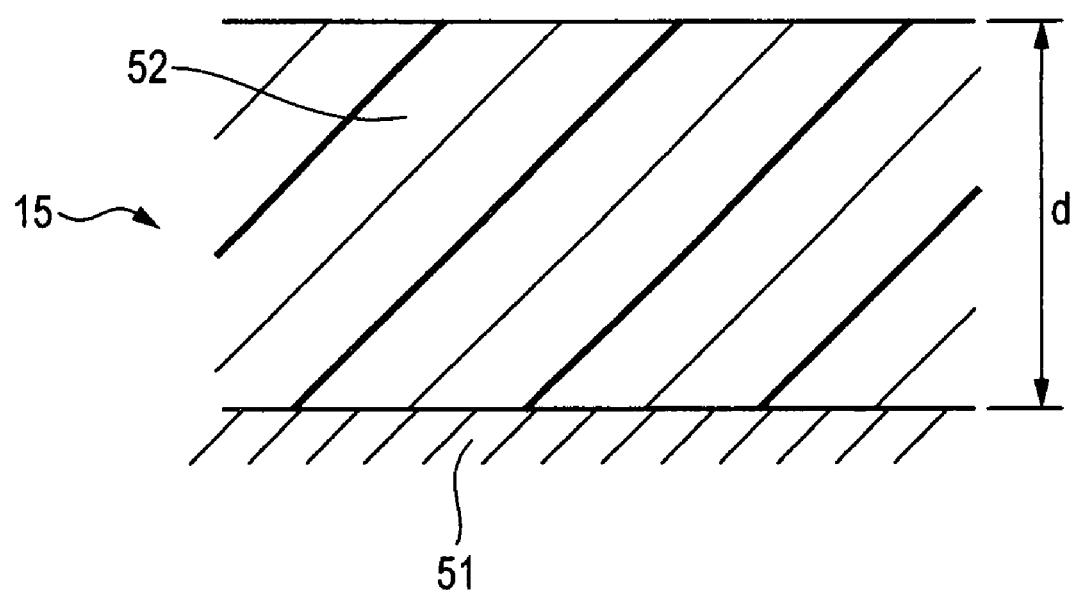
FIG. 3 is a schematic representation to show a photoconductor layer of a photoconductor drum.

The photoconductor drum 15 has a photoconductor layer 52 of an OPC (organic photoconductor), etc., formed in a thickness d on a surface of a conductive cylinder 51 made of metal, for example, as shown in FIG. 3 and is driven at a rotation speed along the arrow A direction (see FIG. 2) by a drive source (not shown). The photoconductor drum 15 has the photoconductor layer 52 of an OPC (organic photoconductor), etc., formed in the thickness d on the surface of the conductive cylinder 51 made of metal as described above; however, it is difficult to uniformly form the photoconductor layer 52 over the full surface of the conductive cylinder 51 and the photoconductor layer 52 is non-uniformly worn by the cleaning unit 18, etc., with time and thus partial thickness d variation (thickness unevenness) of the photoconductor layer 52 inevitably occurs along the rotation direction of the photoconductor drum 15 (subscanning direction). The photoconductor layer 52 may be formed of one layer or may be made up of a plurality of functionally separated photoconductor layers. The photoconductor may be shaped not only like a drum, but also like a belt, of course.

Figure 4:
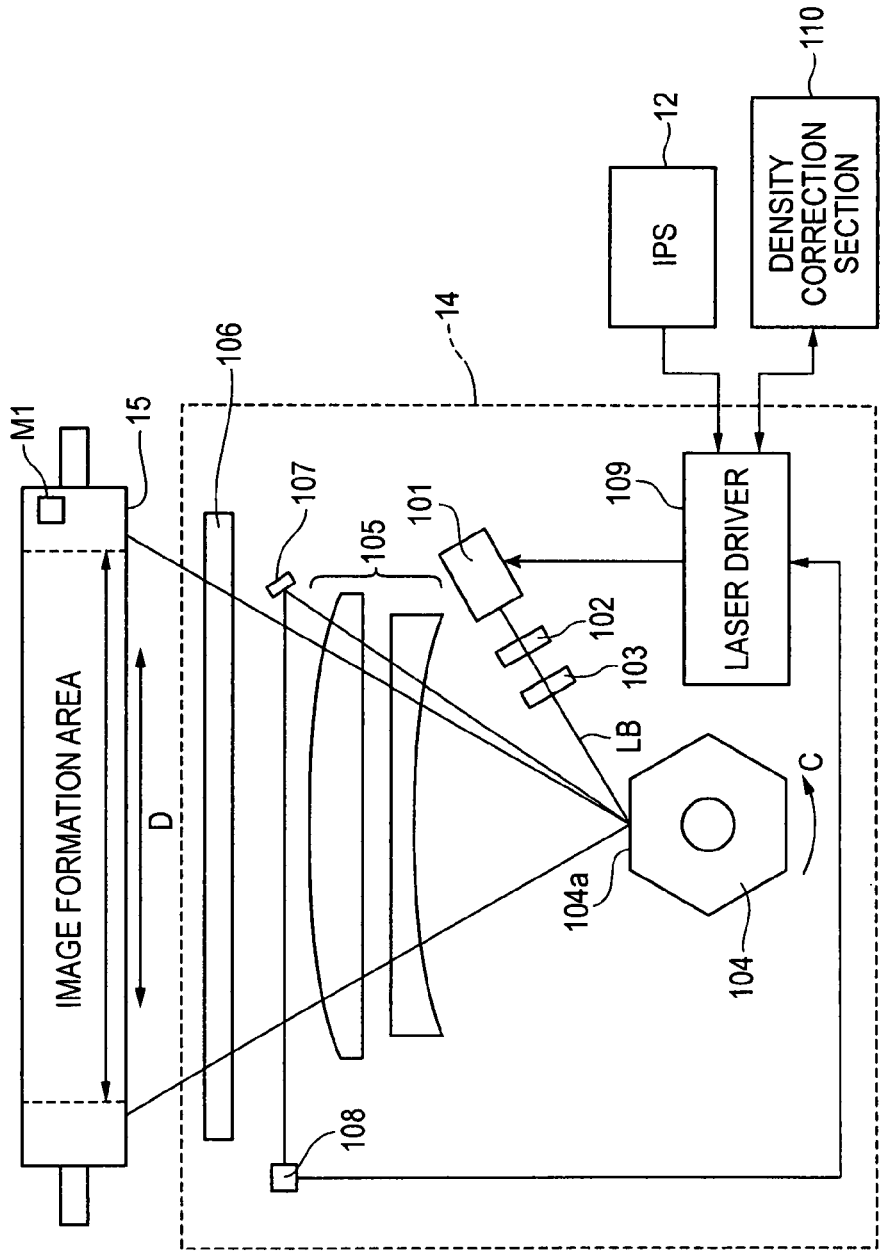
FIG. 4 is a drawing to show the configuration of an ROS.

The ROS 14 modulates a semiconductor laser 101 in response to image data by a laser driver 109 and emits a laser beam LB from the semiconductor laser 101 in response to image data output from the image processing apparatus (IPS) 12 as shown in FIG. 4. The laser beam LB emitted from the semiconductor laser 101 is reflected by a reflecting face 104a of a rotating polygon mirror 104 rotating in the arrow C direction through a collimator lens 102 and a cylindrical lens 103 and is deflected and scanned along the arrow D direction and is scanned and exposed as a long line image along the main scanning direction (arrow D direction) on the photoconductor drum 15 as a photoconductor through a reflecting mirror 106 in a state in which the focal length is adjusted in response to the scan direction through an f-θ lens 105. A reflecting mirror 107 is disposed at any position other than the image formation area at the start end of the laser beam LB in the scanning direction thereof, and the laser beam LB reflected on the reflecting mirror 107 is made incident on an SOS (Start of Scan) sensor 108. Whenever the laser beam LB scans over the surface of the photoconductor drum 15, the first laser beam LB of each scan line is made incident on the SOS sensor 108. The SOS sensor 108 detects the application timing for each scan line over the surface of the photoconductor drum 15 and generates a signal indicating the application start timing (SOS signal).

The laser driver 109 for outputting a laser drive signal responsive to the image data output from the image processing apparatus (IPS) 12 at a timing is connected to the semiconductor laser 101. The laser driver 109 demodulates the semiconductor laser 101 to perform ON/OFF control in response to the image data from the image processing apparatus 12. Accordingly, the laser beam LB corresponding to the image data is output from the semiconductor laser 101. The laser driver 109 is also connected to the SOS sensor 108 and the SOS signal generated by the SOS sensor 108 is input to the laser driver 109. The laser driver 109 sets the start timing of output of a laser drive signal for the semiconductor laser 101 in response to the SOS signal from the SOS sensor 108.

Further, a density correction section 110 is connected to the laser driver 109. The density correction section 110 generates a light amount setting signal to suppress density unevenness in the subscanning direction caused by partial thickness variation of the photoconductor drum 15 and outputs the light amount setting signal to the laser driver 109. The laser driver 109 adjusts the light amount of the laser beam LB output from the semiconductor laser 101 in response to the light amount setting signal from the density correction section 110. The light amount of the laser beam LB is adjusted by the time the surface of the photoconductor drum 15 is actually scanned and exposed after a thickness variation detection section 61 detects thickness variation of the photoconductor layer 52 of the photoconductor drum 15 as described later. The density correction section 110 may be disposed in the image processing apparatus (IPS) 12.

Thus, color image data is output in sequence from the image processing apparatus (IPS) 12 to the ROSs 14Y, 14M, 14C, and 14K of the image formation sections 13Y, 13M, 13C, and 13K of colors of yellow (Y), magenta (M), cyan (C), and black (K), and the laser beams LB emitted in response to image data from the ROSs 14Y, 14M, 14C, and 14K are scanned over the surfaces of photoconductor drums 15Y, 15M, 15C, and 15K to form electrostatic latent images thereon. The electrostatic latent images formed on the photoconductor drums 15Y, 15M, 15C, and 15K are developed by developing units 17Y, 17M, 17C, and 17K as color toner images of yellow (Y), magenta (M), cyan (C), and black (K).

The color toner images of yellow (Y), magenta (M), cyan (C), and black (K) formed in sequence on the photoconductor drums 15Y, 15M, 15C, and 15K of the image formation sections 13Y, 13M, 13C, and 13K are transferred onto an intermediate transfer belt 25 as an interface transfer body placed below the image formation sections 13Y, 13M, 13C, and 13K in a state in which the toner images are superposed on each other by primary transfer rolls 26Y, 26M, 26C, and 26K, as shown in FIG. 2. The intermediate transfer belt 25 is placed under a given tension on a drive roll 27, a tension roll 28, a steering roll 29, an idler roll 30, a backup roll 32 against which a feeding roll 31 is abutted, and an idler roll 33, and is circulated at a speed roughly equal to that of the photoconductor drum 15Y, 15M, 15C, 15K along the arrow B direction by the drive roll 27 rotated by a dedicated drive motor excellent in constant speed property (not shown).

The intermediate transfer belt 25 is formed of a film-like endless belt with a proper amount of an antistatic agent of carbon black, etc., contained in a resin of polyimide, polyamide, or the like. It is formed so that volume resistivity becomes $10^6$ to $10^{14}$ Ωcm, for example, and the thickness is set to about 0.1 mm, for example.

A primary transfer section is implemented as the primary transfer roll 26 placed facing the photoconductor drum 15 with the intermediate transfer belt 25 between. The primary transfer roll 26 has a shaft and a sponge layer as an elastic layer fixedly secured to the surrounding of the shaft. The shaft is a cylindrical rod made of metal of iron, stainless steel, etc. The sponge layer is formed of blend rubber of NBR, SBR, and EPDM mixed with a conductive agent of carbon black, etc., and is a sponge-like cylindrical roll whose volume resistivity is $10^{7.5}$ to $10^{8.5}$ Ωcm, for example.

The color toner images of yellow (Y), magenta (M), cyan (C), and black (K) multiply transferred onto the intermediate transfer belt 25 are secondarily transferred onto record paper 35 as a record medium by a pressing force and an electrostatic force by a secondary transfer roll 34 for coming in press contact with the backup roll 32 through the intermediate transfer belt 25, and the record paper 35 onto which the color toner images are transferred is transported to a fuser 38 with a transport belt 36 and a transport guide 37. The record paper 35 onto which the color toner images are transferred is subjected to fixing treatment by heat and pressure by a heating roll 39 and a pressurization roll 40 of the fuser 38 and is ejected by an ejection roll 41 onto an ejection tray 42 provided outside the printer main body 1.

A secondary transfer section is made up of the secondary transfer roll 34 placed on the toner image support face side of the intermediate transfer belt 25 and the backup roll 32. The backup roll 32 is made up of a tube of blend rubber of EPDM and NBR with carbon dispersed on a surface and EPDM rubber inside the backup roll. It is formed so that surface resistivity becomes $10^7$ to $10^{10}$ Ω/□, for example, and the hardness is set to 70° (ASKER C stiffness), for example.

The secondary transfer roll 34 is made up of a shaft and a sponge layer as an elastic layer fixedly secured to the surrounding of the shaft. The shaft is a cylindrical rod made of metal of iron, stainless steel, etc. The sponge layer is formed of blend rubber of NBR, SBR, and EPDM mixed with a conductive agent of carbon black, etc., and is a sponge-like cylindrical roll whose volume resistivity is $10^{7.5}$ to $10^{8.5}$ Ωcm, for example.

The record paper 35 of a size and material is once transported from a paper tray 43 disposed on the bottom of the printer main body 1 via a paper transport passage 48 made up of a paper feed roller 44 and roller pairs 45, 46, and 47 for transporting paper to a registration roll 49 and then is stopped as shown in FIG. 2. The record paper 35 supplied from the paper tray 43 is sent to the secondary transfer position of the intermediate transfer belt 25 by the registration roll 49 driven at a timing.

The transfer toner remaining on the intermediate transfer belt 25 is removed by a cleaning unit 50 for the intermediate transfer belt, placed at a position opposed to the idler roll 33.

In FIG. 2, numeral 51 denotes a density sensor for detecting a toner patch for process control and registration control, formed on the intermediate transfer belt 25.

By the way, in the embodiment, the image formation apparatus includes a photoconductor being rotated; a contact charging unit for charging the surface of the photoconductor in a state in which the charging unit is in contact with the surface of the photoconductor; a bias voltage application unit for applying a DC bias voltage on which an AC voltage is superposed to the charging unit; a current detection unit for detecting DC current flowing into the charging unit; a thickness variation detection unit for detecting a thickness variation along the rotation direction of the photoconductor in response to the DC current value detected by the current detection unit; and a controller for controlling an image formation condition in response to the detection result of the thickness variation detection unit.

Figure 1:
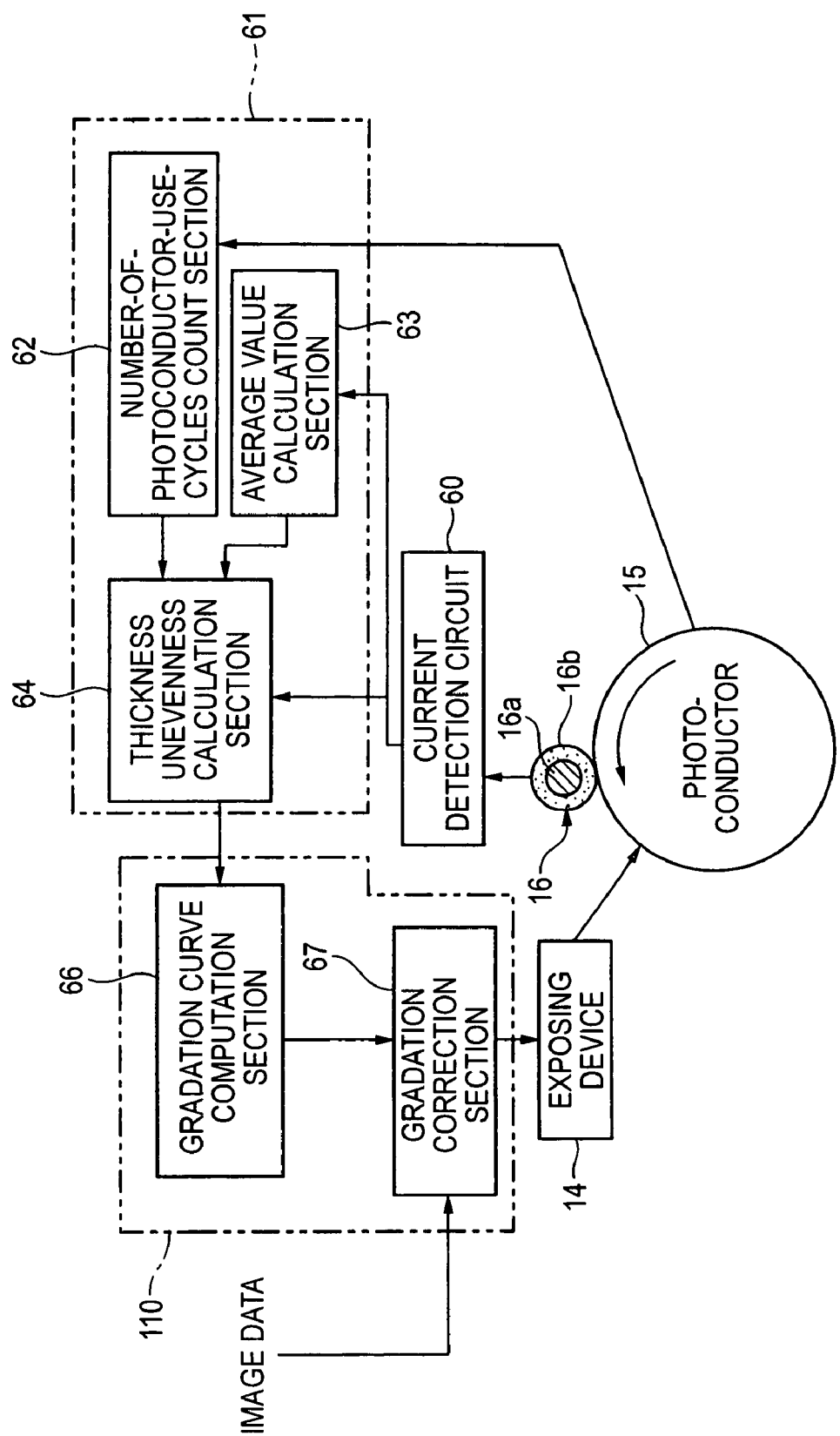
FIG. 1 is a block diagram to show the configuration of the main part of a tandem full-color printer as an image formation apparatus incorporating a thickness variation detector of a photoconductor and an image formation unit according to a first exemplary embodiment of the invention.
Figure 5:
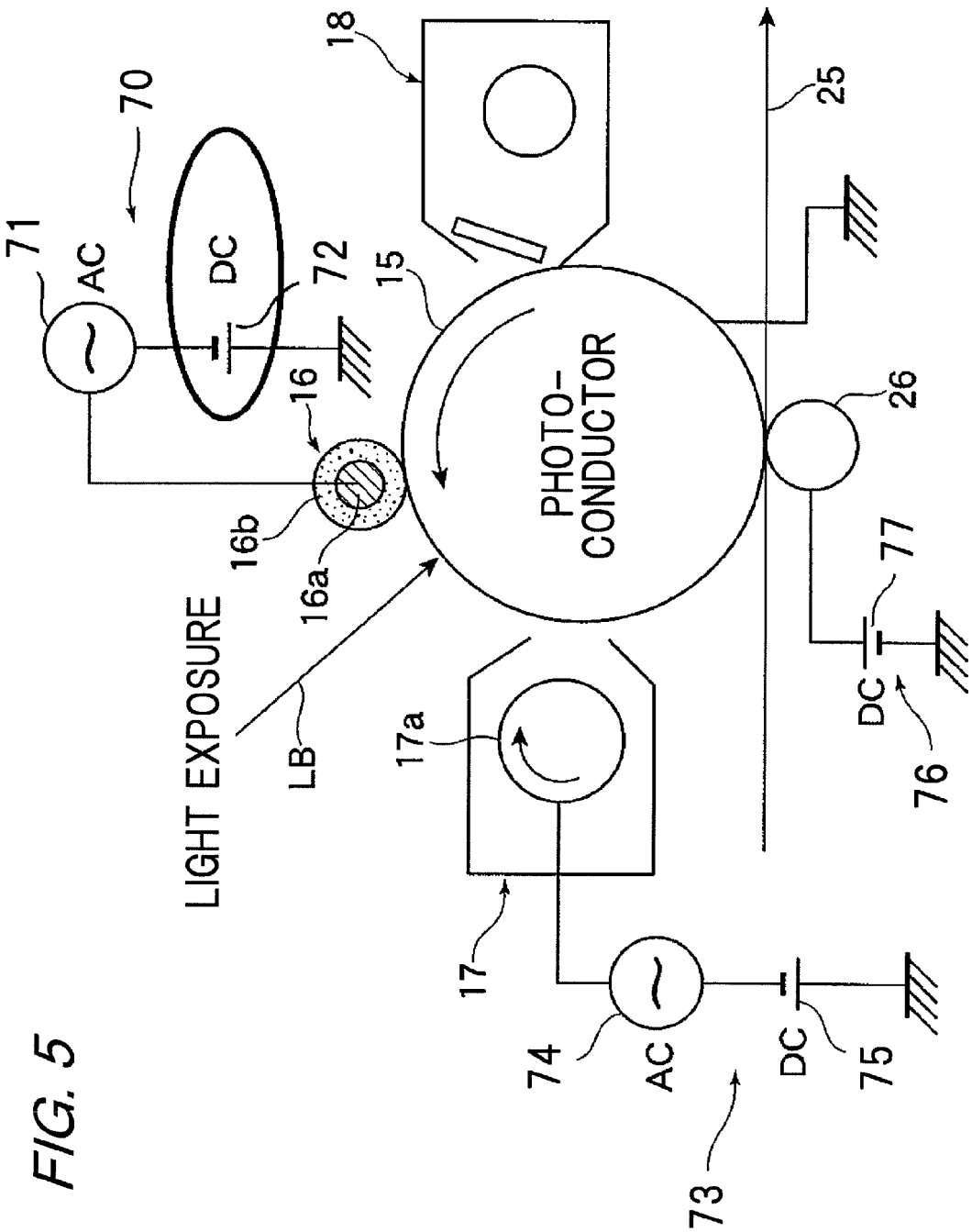
FIG. 5 is a drawing to show the configuration of a power supply circuit of the full-color printer.

That is, in the embodiment, the surface of the photoconductor drum 15 is charged to a potential by the contact charging roll 16 for charging the surface of the photoconductor drum 15 in a state in which the charging roll 16 comes in contact with the surface of the photoconductor drum 15 as shown in FIG. 1. The charging roll 16 is made up of a cylindrical core 16a made of metal of iron, stainless steel, etc., and a conductive elastic layer 16b put on the outer periphery of the cylindrical core 16a. As a bias power supply 70 for charging, an AC power supply 71 for applying a high voltage of AC and a DC power supply 72 for applying a given DC high voltage are connected in series to the cylindrical core 16a of the charging roll 16 as shown in FIG. 5. The DC power supply 72 applies a negative DC voltage to the cylindrical core 16a of the charging roll 16.

The contact charging roll charges the surface of the photoconductor drum 15 to the potential as DC voltage on which AC voltage is superposed is applied to the cylindrical core 16a of the charging roll 16 from the AC power supply and the DC power supply 72 and minute gap discharge, etc., is produced between the conductive elastic layer 16b of the charging roll 16 and the surface of the photoconductor drum 15.

DC voltage on which AC voltage is superposed is applied to a developing roll 17a of the developing unit 17 from an AC power supply 74 for applying high voltage of AC and a DC power supply 75 for applying high voltage of DC as a developing bias power supply 73. Further, a transfer bias of positive polarity is applied to the primary transfer roll 26 from a DC power supply 77 for applying high voltage of DC as a transfer bias power supply 76.

Figure 6:
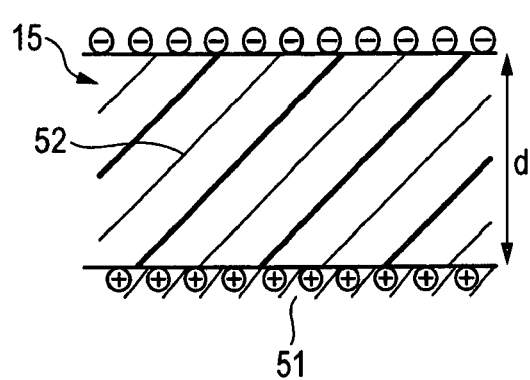
FIG. 6 is a schematic representation to show the charge state of a photoconductor layer of the photoconductor drum.
Figure 6:
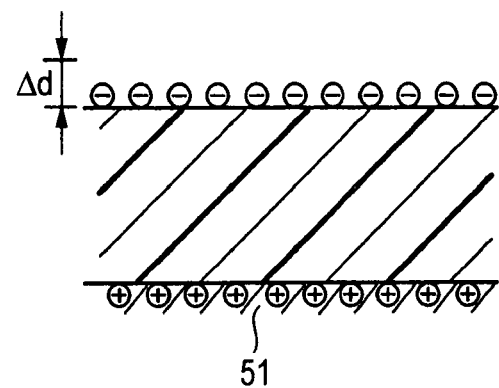

As shown in FIG. 6, the photoconductor drum 15 has the photoconductor layer 52 made up of a charge generation layer, a charge transport layer, etc., of an OPC (organic photoconductor), etc., formed in the thickness d on the surface of the conductive cylinder 51; it functions as a capacitor having the conductive cylinder 51 as one electrode and the photoconductor layer 52 as a dielectric layer from the electric viewpoint. The surface of the photoconductor drum 15 is charged by the charging roll 16, whereby negative-polarity charges are held on the surface of the photoconductor drum 15 as shown in FIG. 6.

If the photoconductor drum 15 is viewed as a capacity as described above, as shown in FIG. 6(b), the thickness d of the photoconductor layer 52 made of a dielectric body varies partially due to application variations, age biased wear, etc., and as the thickness d of the photoconductor layer 52 becomes thin, electrostatic capacity C of the photoconductor layer 52 increases. Letting the dielectric constant of the photoconductor layer 52 be ∈ and the thickness of the photoconductor layer 52 be d, the electrostatic capacity C per unit area of the photoconductor layer 52 can be represented as C=∈/d. The thickness d of the photoconductor layer 52 decreases due to application variations and biased wear and in the change portion from the thickness d to thickness (d−Δd), the electrostatic capacity C of the photoconductor layer 52 increases from C1=∈/d to C2=∈/(d−Δd) (C1<C2). Then, when the surface of the photoconductor drum 15 is charged by the charging roll 16, the surface of the photoconductor drum 15 is negatively charged to a uniform potential VH regardless of the thickness unevenness of the photoconductor layer 52. However, when the thickness of the photoconductor layer 52 becomes thin, the electrostatic capacity C of the photoconductor layer 52 increases as described above. Thus, many negative charges are supplied to the portion where the thickness of the photoconductor layer 52 is thin, and the current flowing into the charging roll 16 increases in the portion.

Thus, when image exposure is applied to the surface of the photoconductor drum 15 to form an electrostatic latent image, the negative charge amount increases in the portion where the thickness of the photoconductor layer 52 is thin and therefore to lower the potential of the portion where the thickness is thin, more positive charges need to be produced by image exposure. However, since the image exposure amount is constant on the photoconductor drum 15, exposure part potential VL of the portion where the thickness of the photoconductor layer 52 is thin becomes high as compared with other portions, namely, potential unevenness occurs.

Figure 7:
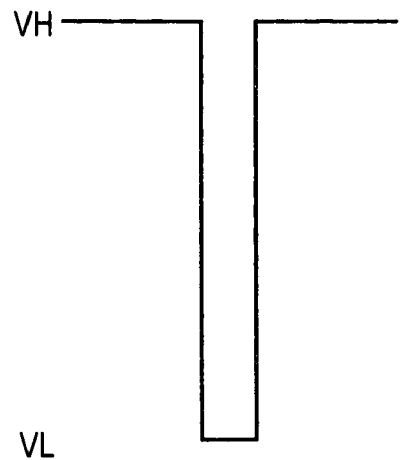
FIG. 7 is a schematic representation to show charge potentials of the photoconductor drum.
Figure 7:
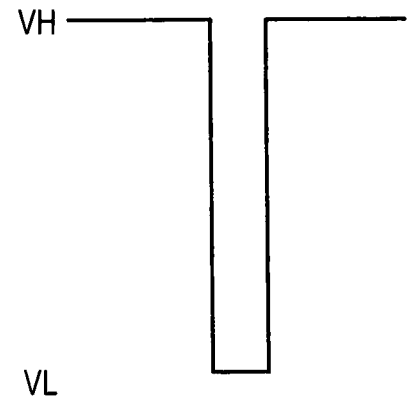

Thus, if there are variations in the exposure part potential VL of the photoconductor drum 15 caused by biased wear of the thickness of the photoconductor layer 52 of the photoconductor drum 15 or the like, as shown in FIG. 7, when image exposure is applied to the surface of the photoconductor drum 15 using the laser beam LB to form an electrostatic latent image 53 and the electrostatic latent image 53 is reversally developed by the developing roll 17a of the developing unit 17, if the exposure part potential VL of the photoconductor drum 15 varies, the developing electric field fluctuates and the density of the developed toner image varies. That is, the density of the developed toner image, when the exposure part potential VL of the photoconductor drum 15 is high, becomes thin as compared with the case where the exposure part potential VL of the photoconductor drum 15 is low.

Figure 8:
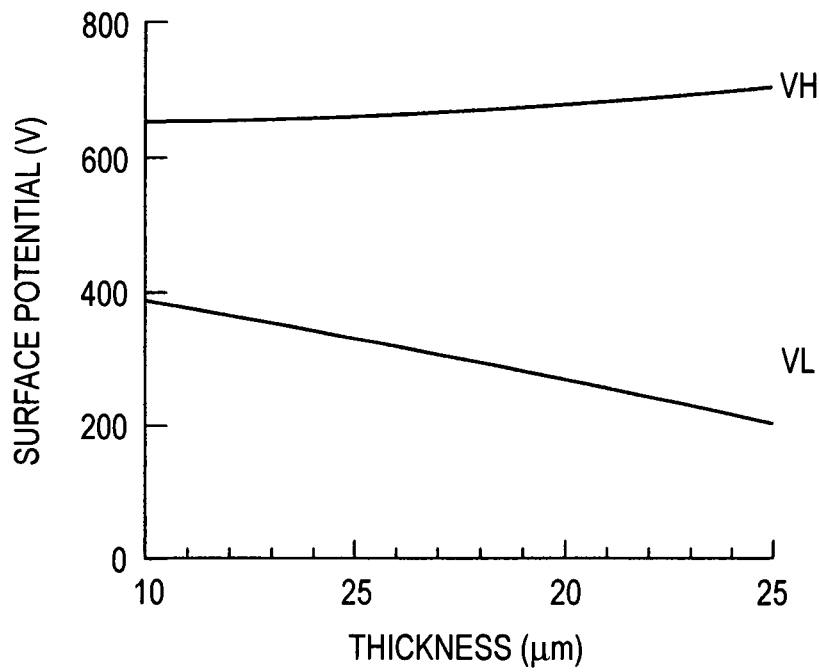
FIG. 8 is a graph to show the relationship between the thickness and the surface potential of the photoconductor layer of the photoconductor drum.

Consequently, if the thickness d of the photoconductor layer 52 of the photoconductor drum 15 varies, as shown in FIG. 8, the exposure part potential VL of the photoconductor drum 15 changes in response to the variation of the thickness d of the photoconductor layer 52 and when an image at a uniform density is formed on the surface of the photoconductor drum 15, etc., partial inconsistencies in density (banding) appear along the rotation direction of the photoconductor drum 15.

Then, in the embodiment, when the surface of the photoconductor drum 15 is charged by the charging roll 16, a current detection circuit 60 detects DC current $I_{DC}$ flowing into the charging roll 16 and the thickness variation detection section 61 as a thickness variation detection unit detects the biased wear amount of the partial variation of the thickness d of the photoconductor layer 52 of the photoconductor drum 15 in response to the DC current $I_{DC}$ detected by the current detection circuit 60 as shown in FIG. 1. The thickness variation detection section 61 is implemented as a CPU, etc., as a controller of the printer, but is not limited to it and may be implemented as an independent circuit, of course.

The DC current $I_{DC}$ flowing into the charging roll 16 is a value resulting from dividing charge amount Q given to the photoconductor layer 52 by charging time T when the photoconductor layer 52 of the photoconductor drum 15 functioning as a capacity is charged to a potential, and is given according to the following expression:

$$I_{DC}=Q/T$$

Figure 9:
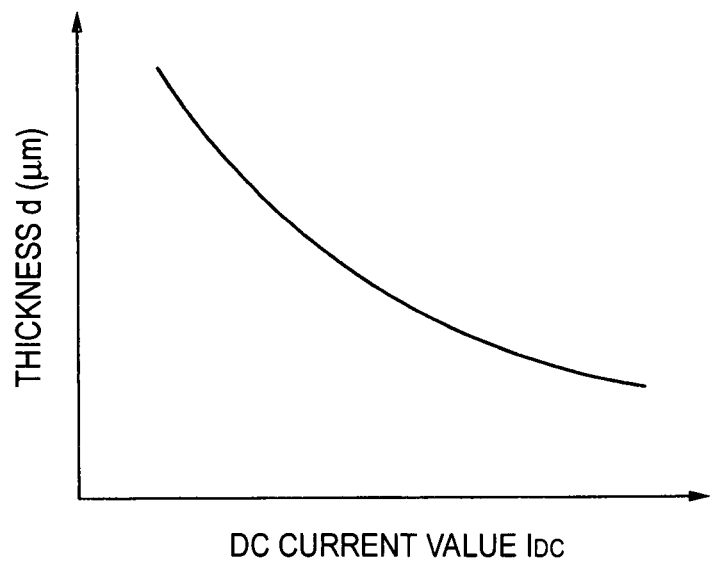
FIG. 9 is a graph to show the relationship between the DC current value and the thickness of the photoconductor layer.

Since surface potential V of the photoconductor drum 15 is given as V=Q/C, the electrostatic capacity C per unit area of the photoconductor layer 52 of the photoconductor drum 15 becomes C=Q/V and is represented as C=∈/d using the dielectric constant ∈ and the thickness d of the photoconductor layer 52 and therefore the thickness d of the photoconductor layer 52 is found as $d=∈V/(I_{DC} \cdot T)$ relative to the DC current $I_{DC}$ flowing into the charging roll 16 as shown in FIG. 9.

Therefore, when the surface of the photoconductor drum 15 is charged by the charging roll 16, the current detection circuit 60 detects the DC current $I_{DC}$ flowing into the charging roll 16, whereby the thickness variation detection section 61 detects the partial thickness d of the photoconductor layer 52 of the photoconductor drum 15 in response to the DC current $I_{DC}$.

In the embodiment, a number-of-photoconductor-use-cycles count section 62 cumulatively counts the number of use cycles (the number of revolutions) of each photoconductor drum 15 in the image formation sections 13Y, 13M, 13C, and 13K of colors of yellow (Y), magenta (M), cyan (C), and black (K) as shown in FIG. 1. Further, the fact that the thickness d of the photoconductor layer 52 of the photoconductor drum 15 decreases gradually in response to the number of use cycles of the photoconductor drum 15 is previously found by experiment as shown in FIG. 10.

Figure 10:
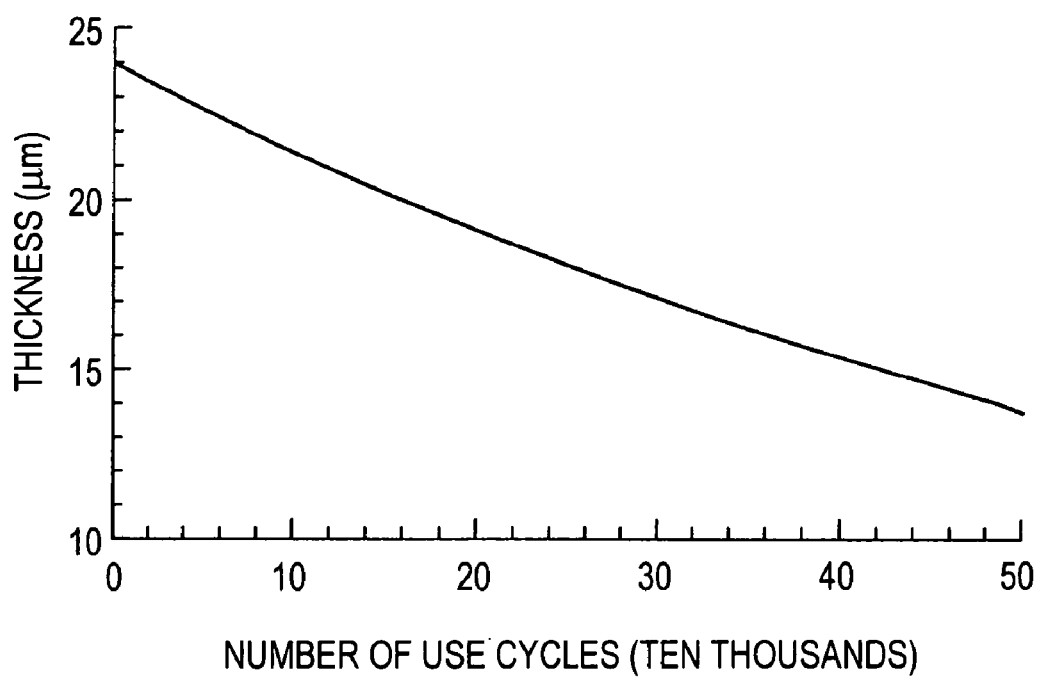
FIG. 10 is a graph to show the relationship between the number of use cycles of the photoconductor drum and the thickness of the photoconductor layer.

Then, the number-of-photoconductor-use-cycles count section 62 previously retains data of the thickness d of the photoconductor layer 52 as shown in FIG. 10 in response to the number of use cycles (the number of revolutions) of the photoconductor drum 15 cumulatively counted. The photoconductor layer 52 shown in FIG. 10 has the initial thickness d set to 24 µm. The data of the thickness d of the photoconductor layer 52 is an average value in one round of the photoconductor drum 15 used with the printer. The number-of-photoconductor-use-cycles count section 62 may count the number of revolutions of the photoconductor drum 15 as the number of use cycles of the photoconductor drum 15. However, since the effect on wear of the photoconductor layer varies depending on whether or not a toner image is formed on the photoconductor drum 15, the number-of-photoconductor-use-cycles count section 62 may count the number of image formation cycles, namely, the number of revolutions in the image formation operation rather than the number of revolutions of the photoconductor drum 15 or may count the number of print sheets.

Further, the thickness variation detection section 61 includes an average value calculation section 63 for averaging the DC current $I_{DC}$ flowing into the charging roll 16, detected by the current detection circuit 60 and a thickness unevenness calculation section 64 for calculating partial thickness d of the photoconductor layer 52 in response to the DC current values $I_{DC}$ from the number-of-photoconductor-use-cycles count section 62, the average value calculation section 63, and the current detection circuit 60, as shown in FIG. 1. The DC current $I_{DC}$ flowing into the charging roll 16 varies depending on the thickness d of the photoconductor layer 52 as shown in FIG. 10; the thickness d of the photoconductor layer 52 differs partially in response to the position along the rotation direction of the photoconductor drum 15 depending on the DC current $I_{DC}$ on an enlarged scale shown in FIG. 12.

Figure 12:
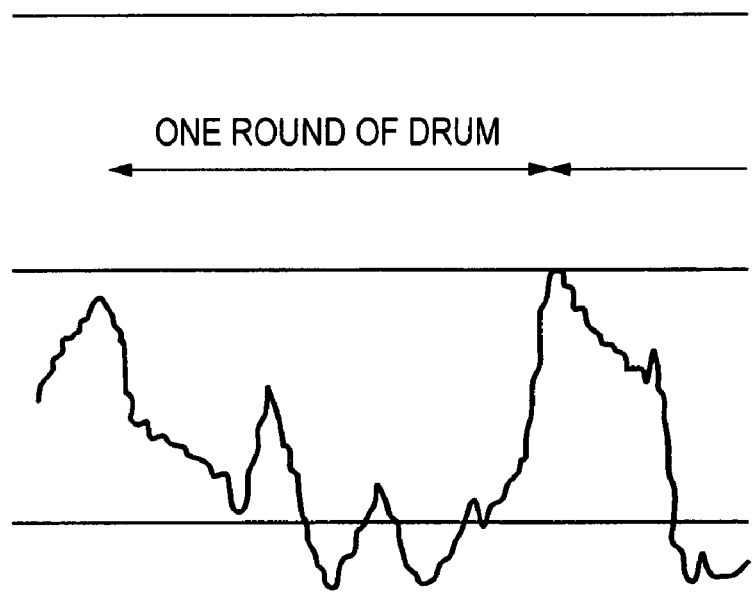
FIG. 12 is a graph to show change in the value of DC current flowing into the charging roll.
Figure 13:
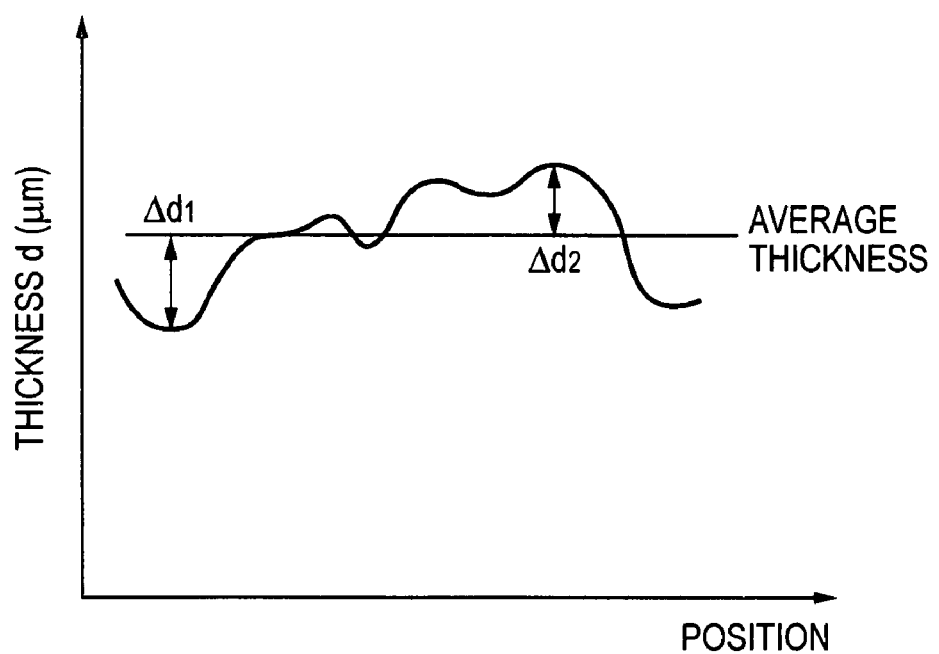
FIG. 13 is a graph to show the thickness of the photoconductor layer.

In the embodiment, the average value calculation section 63 for averaging the DC current $I_{DC}$ flowing into the charging roll 16, detected by the current detection circuit 60 as described above as shown in FIG. 1 is included. The average value calculation section 63 calculates the average value (in one round of the photoconductor drum 15) of the DC current $I_{DC}$ partially varying in response to the position along the rotation direction of the photoconductor drum 15 as shown in FIG. 12, and the thickness unevenness calculation section 64 references a graph as shown in FIG. 10 in response to the average value of the DC current $I_{DC}$ and the number of use cycles of the photoconductor drum 15 counted by the number-of-photoconductor-use-cycles count section 62 described above and finds the thickness d of the photoconductor layer 52. Here, the found thickness d of the photoconductor layer 52 is the thickness d averaged per revolution of the photoconductor drum 15.

Further, in addition to the average value of the thickness d of the photoconductor layer 52 found as described above, the thickness unevenness calculation section 64 references the relationship between the DC current value $I_{DC}$ and the thickness d of the photoconductor layer 52 as shown in FIG. 9 based on the DC current value $I_{DC}$ input from the current detection circuit 60, and calculates the partial thickness d of the photoconductor layer 52 in one round of the photoconductor drum 15, namely, thickness unevenness d of the photoconductor layer 52.

That is, although the average thickness d of the photoconductor layer 52 responsive to the number of use cycles of the photoconductor drum 15 is found in response to the average value of the DC current $I_{DC}$ calculated by the average value calculation section 63, the thickness d of the photoconductor layer 52 is calculated in response to each DC current value $I_{DC}$ and the thickness d partially varies from one position to another along the rotation direction of the photoconductor drum 15.

Then, the thickness unevenness calculation section 64 calculates the partial thickness d of the photoconductor layer 52 in one round of the photoconductor drum 15, namely, thickness unevenness of the photoconductor layer 52 as d1, d2, . . . in addition to the average value of the thickness d of the photoconductor layer 52. In the thickness unevenness calculation section 64, to remove the effect of noise on the DC current value $I_{DC}$ input from the current detection circuit 60, a filter of a low-pass filter, a band-pass filter, etc., for a current detection signal may be added in the current detection circuit 60 and a gradation curve computation section 66 described later.

In the embodiment, a density correction section 110 is also included as shown in FIG. 1. This density correction section 110 is made up of a gradation curve computation section 66 and a gradation correction section 67. The gradation curve computation section 66 computes a gradation curve to correct the effect of biased wear of partial thickness unevenness of the photoconductor layer 52 of the photoconductor drum 15 in response to unevenness of the partial thickness d of the photoconductor layer 52 calculated by the thickness unevenness calculation section 64.

Further, in the embodiment, as shown in FIG. 1, if the density correction section 110 determines that the thickness d of the photoconductor layer 52 calculated by the thickness unevenness calculation section 64 falls below the lower limit value even partially, the density correction section 110 prohibits print operation and displays the fact that the photoconductor drum 15 reaches its life on a user interface (not shown). At this time, since it is feared that the thickness d of the photoconductor layer 52 may be determined to fall below the lower limit value because of erroneous detection in the thickness unevenness calculation section 64, print operation may be prohibited and the fact that the photoconductor drum 15 reaches its life may be displayed on a user interface (not shown) only if it has been determined successive times that the thickness d of the photoconductor layer 52 falls below the lower limit value.

Figure 14:
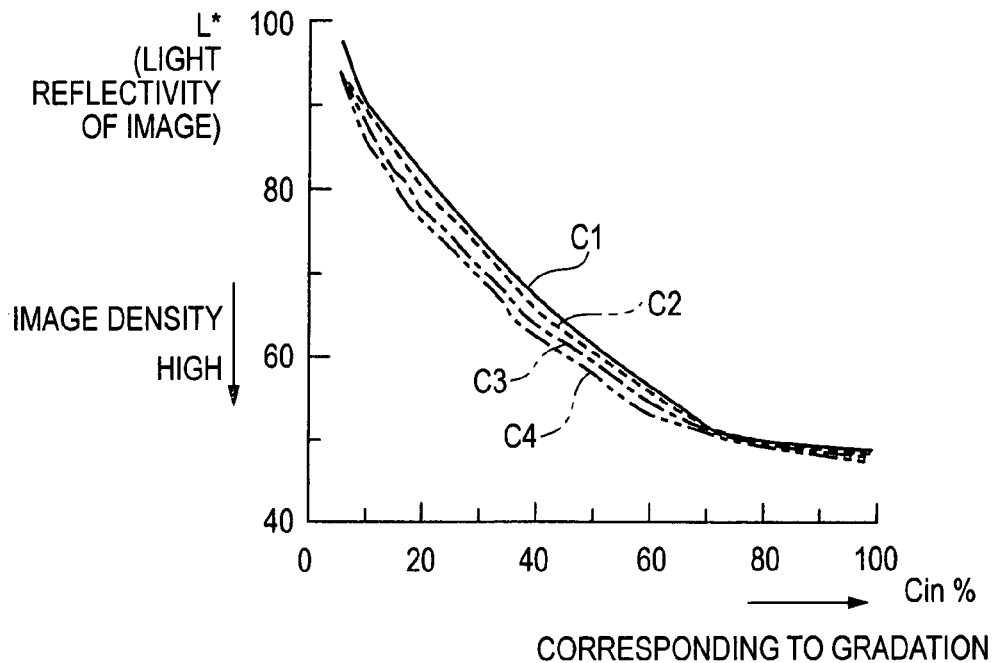
FIG. 14 is a graph to show image density change accompanying the thickness of the photoconductor layer.

The gradation curve computation section 66 previously stores data as to how the image density output relative to the input image data changes in response to variation of the thickness d of the photoconductor layer 52 if the thickness d of the photoconductor layer 52 of the photoconductor drum 15 varies as shown in FIG. 14. In the figure, C1 indicates the case where the photoconductor drum 15 is in the initial state; the thickness d of the photoconductor layer 52 is 24 μm, for example. C2 indicates a state in which the thickness d of the photoconductor layer 52 decreases 5 μm, C3 indicates a state in which the thickness d of the photoconductor layer 52 decreases 10 μm, and C4 indicates a state in which the thickness d of the photoconductor layer 52 decreases 15 μm.

Then, in the thickness unevenness calculation section 64, when the fact that the thickness d of the photoconductor layer 52 averaged in response to the number of use cycles of the photoconductor drum 15 cumulatively counted by the number-of-photoconductor-use-cycles count section 62 as shown in FIG. 10 decreases 5 μm, for example, is input, it is recognized that the gradation curve changes as indicated by C2 in FIG. 14.

Figure 11:
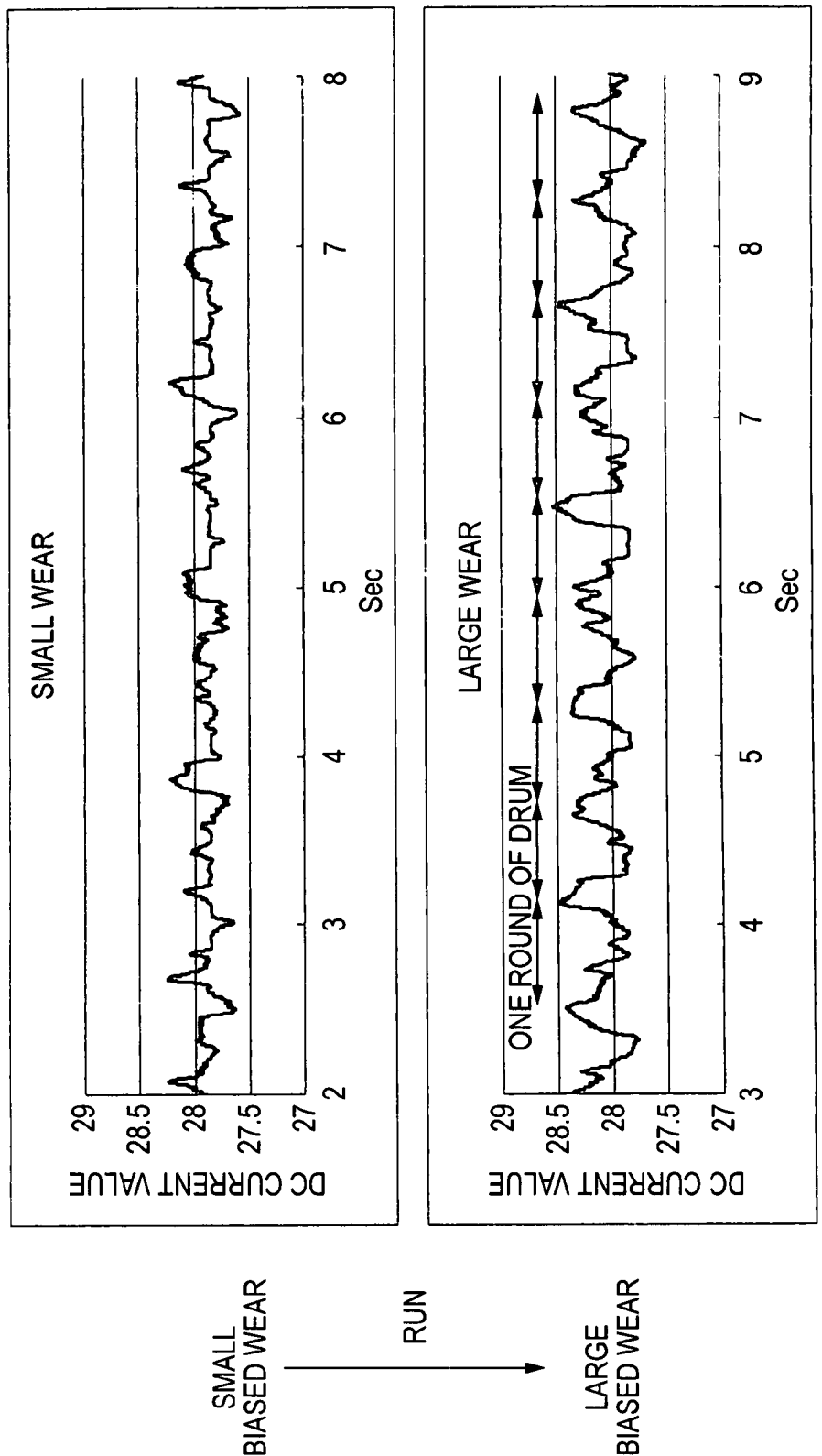
FIG. 11 is a graph to show change in the value of DC current flowing into a charging roll.

Likewise, in the thickness unevenness calculation section 64, if the DC current detection value $I_{DC}$ partially varies along the rotation direction of the photoconductor drum 15 in response to the DC current detection value $I_{DC}$ detected by the current detection circuit 60 as shown in FIGS. 11 and 12, it is recognized that the thickness d of the photoconductor layer 52 varies along the rotation direction of the photoconductor drum 15.

Figure 15:
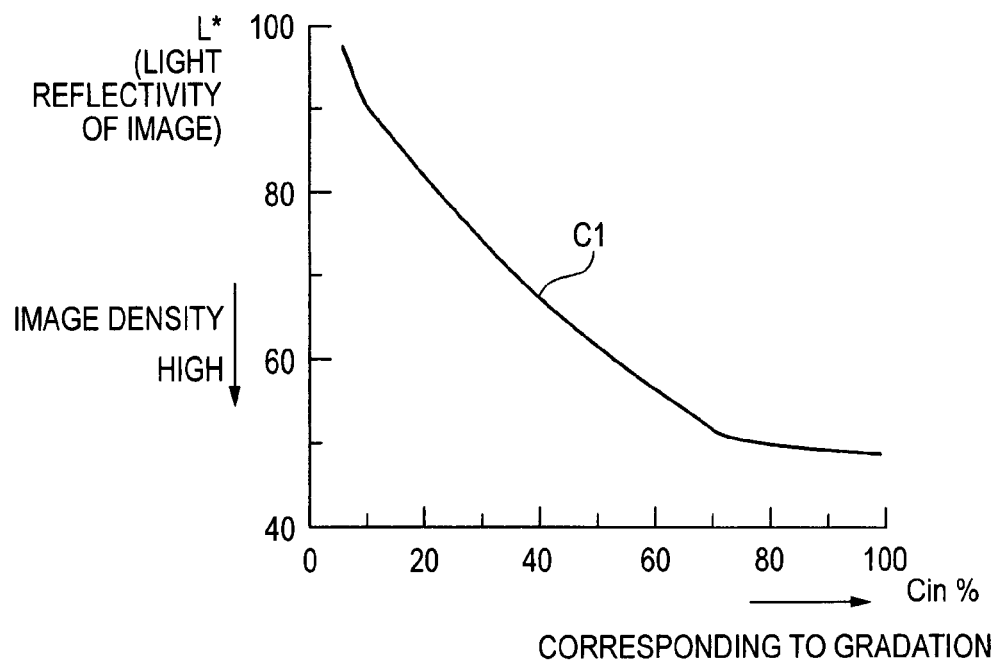
FIG. 15 is a graph to show image density change accompanying the thickness of the photoconductor layer.

For easy understanding, assuming that the photoconductor drum 15 is in an unused state, the gradation curve of the photoconductor drum 15 matches the curve of C1 previously found by experiment as shown in FIG. 15. However, it is assumed that the thickness d of the photoconductor layer 52 of the photoconductor drum 15 varies partially along the rotation direction and that the thickness unevenness calculation section 64 calculates that the variation of the thickness d of the photoconductor layer 52 is 5 μm in response to the DC current detection value $I_{DC}$ detected by the current detection circuit 60.

Figure 16:
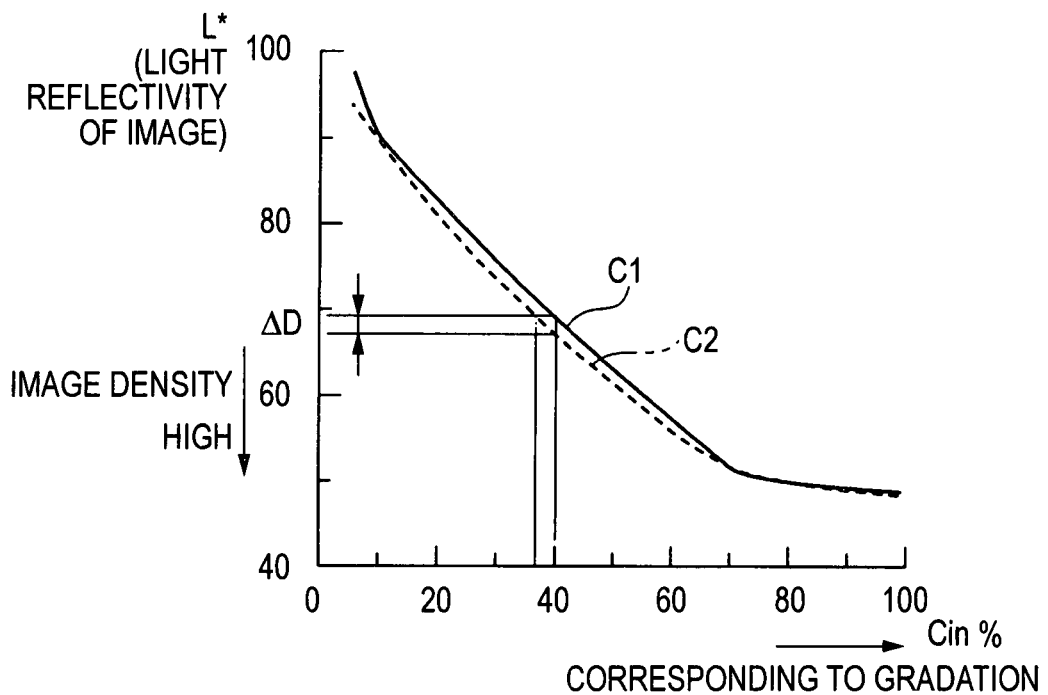
FIG. 16 is a graph to show image density change accompanying the thickness of the photoconductor layer.

Then, in the gradation curve computation section 66, since the thickness d of the photoconductor layer 52 decreases 5 μm on the surface of the photoconductor drum 15 in the part as shown in FIG. 16, to form an image at a density of Cin=40%, for example, the image density increases by D in the portion where the thickness d of the photoconductor layer 52 decreases 5 μm.

Then, to suppress the image density variation of D in the portion where the thickness d of the photoconductor layer 52 decreases 5 μm, the gradation curve computation section 66 computes the gradation curve so as to correct the gradation curve by correcting the image data output to the ROS 14 in response to the input image data so that the density image in Cin=40% becomes equal to or becomes roughly equal to the image density of the photoconductor in the unused state.

Figure 17:
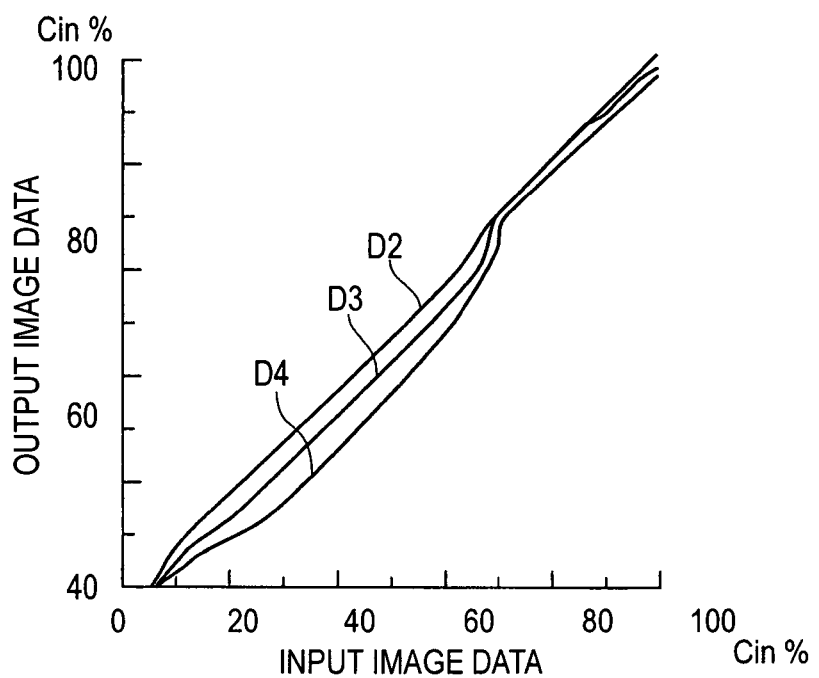
FIG. 17 is a graph to show correction values of image data accompanying the thickness of the photoconductor layer.

Specifically, the gradation curve computation section 66 computes the gradation curve by finding output image data by referencing graph or table in response to curve D2, D3, D4 as shown in FIG. 17 as input image data so that the image density like the case where the photoconductor drum 15 is in an unused state is obtained even in the portion where the thickness d of the photoconductor layer 52 decreases 5 μm, for example. The curve D2 corresponds to the curve C2 in FIG. 14, the curve D3 corresponds to the curve C3, and the curve D4 corresponds to the curve C4.

For intermediate values of the curves C1, C2, C3, C4 shown in FIG. 14, the values of the curves C1, C2, C3, C4 may be interpolated for use or the value corresponding to change in the thickness d of the photoconductor layer 52 every μm may be included aside from FIG. 14.

The gradation correction section 67 as a controller makes a correction to the input image data in response to the gradation curve calculated by the gradation curve computation section 66, outputs image data to the ROS 14 as an exposing device, and corrects the on time and the light amount of the semiconductor laser 101.

The gradation correction section 67 corrects the on time and the light amount of the semiconductor laser 101 in succession in synchronization when the surface of the photoconductor drum 15 where the DC current $I_{DC}$ flowing into the charging roll 16 is detected by the current detection circuit 60 moves to the position of the ROS 14.

In the gradation correction section 67, when the image data output to the ROS 14 is corrected, if the density is corrected according to area coverage modulation, the on time of the semiconductor laser 101 rather than the light amount is controlled.

In the described configuration, the full-color printer according to the embodiment makes it possible to suppress inconsistencies in density of the image caused by thickness variation of the photoconductor, etc., without using a unit for directly detecting the toner amount of a toner image, the thickness or sensitivity unevenness of the photoconductor, or the physical amount of the surface potential of the photoconductor, etc., as follows:

In the full-color printer according to the embodiment, as shown in FIG. 2, to print a full-color image, the surfaces of the photoconductor drums 15 are charged to a potential by the charging rolls 16 in the image formation sections 13Y, 13M, 13C, and 13K of colors of yellow (Y), magenta (M), cyan (C), and black (K) and then image exposure corresponding to the color image data is executed on the surfaces of the photoconductor drums 15 by the ROSs 14Y, 14M, 14C, and 14K to form electrostatic latent images and the electrostatic latent images formed on the photoconductor drums 15 are visualized in corresponding color toners by the developing units 17 to form toner images. The toner images of colors of yellow (Y), magenta (M), cyan (C), and black (K) formed on the photoconductor drums 15 are multiply transferred onto the intermediate transfer belt 25 and then are secondarily transferred from the intermediate transfer belt 25 in batch onto record paper 35 by the secondary transfer roll 34 and are fixed by the fuser 38 to form a full-color image.

At the time, when the surface of each photoconductor drum 15 is charged to the potential by the charging roll 16, the current value $I_{DC}$ of the DC current flowing into the charging roll 16 is detected immediately by the current detection circuit 60 as shown in FIG. 1. The DC current value $I_{DC}$ detected immediately by the current detection circuit 60 is input to the average value calculation section 63, which then calculates average current amount Ave $I_{DC}$.

The average current amount Ave $I_{DC}$ calculated by the average value calculation section 63 is input to the thickness unevenness calculation section 64. The DC current value $I_{DC}$ detected by the current detection circuit 60 is also input to the thickness unevenness calculation section 64. Further, the thickness data of the photoconductor layer 52 responsive to the number of use cycles of the photoconductor drum 15 cumulatively counted by the number-of-photoconductor-use-cycles count section 62 is also stored in the thickness unevenness calculation section 64.

The thickness unevenness calculation section 64 calculates averaged thickness unevenness of the photoconductor layer 52 in response to the number of use cycles of the photoconductor drum 15 cumulatively counted by the number-of-photoconductor-use-cycles count section 62.

The thickness unevenness calculation section 64 also calculates the difference between the DC current value $I_{DC}$ detected by the current detection circuit 60 and the average current amount Ave $I_{DC}$ calculated by the average value calculation section 63, and calculates the partial thickness unevenness value of the photoconductor layer 52 in response to difference $\Delta I_{DC}$ between the DC current value $I_{DC}$ detected by the current detection circuit 60 and the average current amount Ave $I_{DC}$ calculated by the average value calculation section 63.

The partial thickness unevenness value of the photoconductor layer 52 is input to the gradation curve computation section 66, which then computes the correction value to the gradation curve shown in FIG. 17 in response to the relationship shown in FIG. 14, for example, as described above. As the correction to the gradation curve, if the correction value of the thickness data of the photoconductor layer 52 based on the difference $\Delta I_{DC}$ between the DC current value and the average current amount is found as 5 μm, for example, relative to the gradation curve based on the thickness data of the photoconductor layer 52 retained in the number-of-photoconductor-use-cycles count section 62 as shown in FIG. 10, image data output by performing correction computation of the input image data is found in response to the curve D2 of the gradation curve with the thickness 5 μm in the gradation curve as shown in FIG. 17.

The gradation correction section 67 makes a gradation correction to the image data in response to the correction gradation curve computed by the gradation curve computation section 66 and when the surface of the photoconductor drum 15 charged by the charging roll 16 moves to the position of the ROS 14 as an exposing device, image exposure is executed in a state in which the light amount is corrected on the photoconductor drum 15 by the ROS 14 as an exposing device.

Thus, if the thickness of the photoconductor layer 52 of the photoconductor drum 15 contains partial variation along the rotation direction, a gradation correction is made to the image data in response to the gradation curve and the exposure amount of the image is corrected, so that inconsistencies in density of the image caused by thickness variation of the photoconductor layer 52 are suppressed.

Second Embodiment

Figure 18:
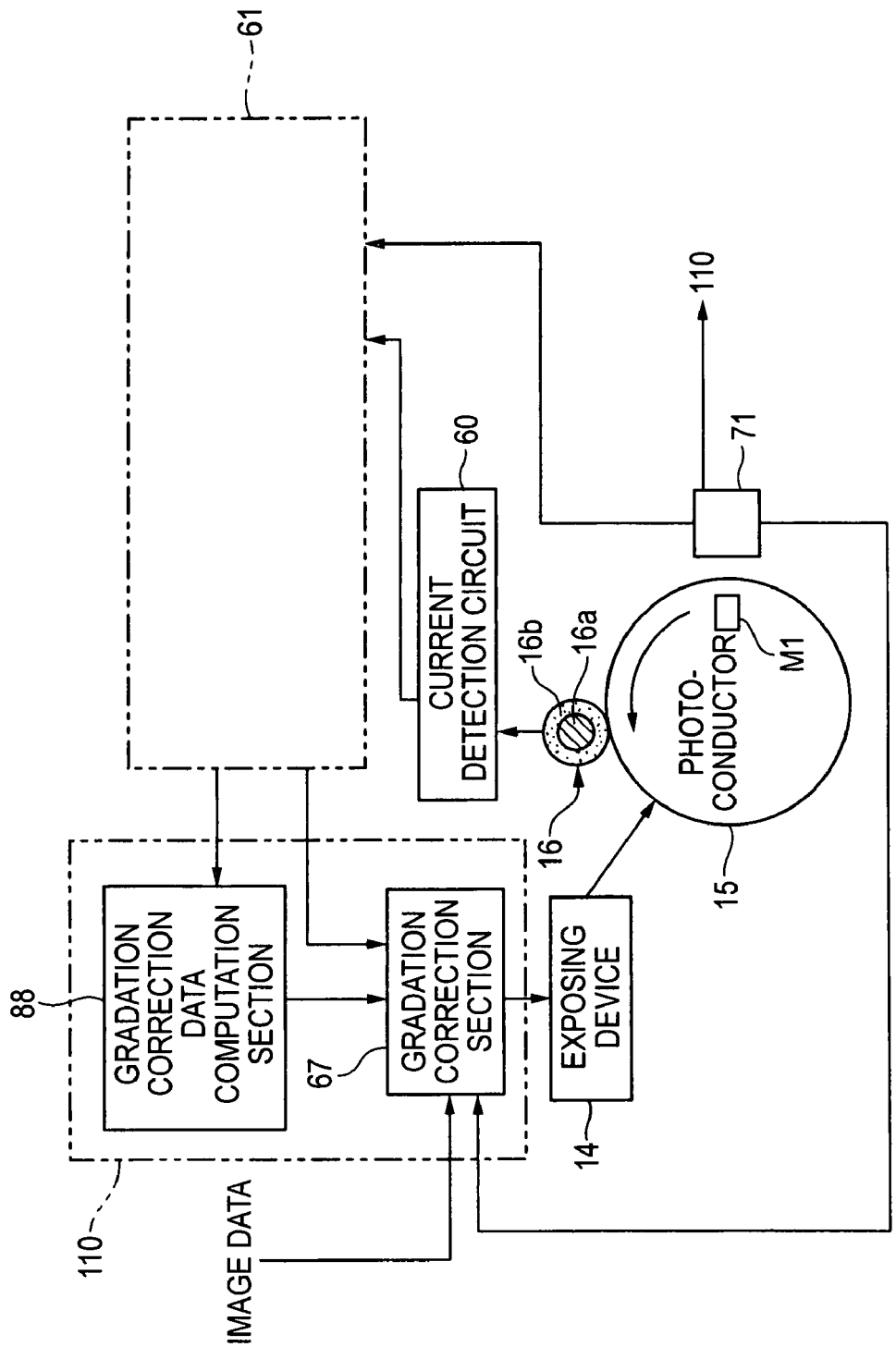
FIG. 18 is a block diagram to show the configuration of the main part of a tandem full-color printer as an image formation apparatus incorporating a thickness variation detector of a photoconductor and an image formation unit according to a second exemplary embodiment of the invention.

FIG. 18 shows a second embodiment of the invention. Parts identical with those of the first embodiment described above are denoted by the same reference numerals in the second embodiment. In the second embodiment, a phase detection unit for detecting the rotation phase of a photoconductor is included and variation of DC current flowing into a charging roll is detected in response to the rotation phase of the photoconductor detected by the phase detection unit, thickness variation of a photoconductor layer in the rotation phase of the photoconductor is previously found, and a gradation correction is executed in response to gradation correction data based on the found thickness.

That is, in the second embodiment, an image exposing device 14 is operated in response to a light amount setting signal set by a density correction section 110, thereby suppressing inconsistencies in density along the rotation direction of a photoconductor drum 15 as shown in FIG. 18. The density correction section 110 acquires data of partial thickness of a photoconductor layer 52 along the rotation direction of the photoconductor drum 15 at an appropriate timing from a thickness variation detection section 61, and sets gradation correction data to generate a light amount setting signal in response to the result.

A phase mark M1 is formed on the surface of the photoconductor drum 15 as shown in FIG. 18. The phase mark M1 is formed outside an image formation area (area where electrostatic latent image and toner image can be formed) in the photoconductor drum 15, for example, as shown in FIG. 2. A phase detection sensor 71 for detecting the phase mark M1 is placed at a position opposed to the surface of the photoconductor drum 15. The phase detection sensor 71 detects the phase mark M1 each time the photoconductor drum 15 makes one revolution. Whenever the phase detection sensor 71 detects the phase mark M1, it outputs a phase signal PS1 to the thickness variation detection section 61. The phase detection sensor 71 also outputs the phase signal PS1 to the density correction section 110.

The phase mark M1 is formed by filling a part of the surface of the photoconductor drum 15, for example, as shown in FIG. 2, but the invention is not limited to the mode. Specifically, for example, the surface state of a part of the photoconductor drum 15 (for example, surface roughness) may be changed or a notch may be made in a part on an end side. The rotation period of the photoconductor drum 15 can also be acquired, for example, by providing a sensor for detecting drive torque of the photoconductor drum 15 or counting the number of pulse signals of the motor for driving the photoconductor drum 15 instead of the sensor for reading the mark.

Figure 19:
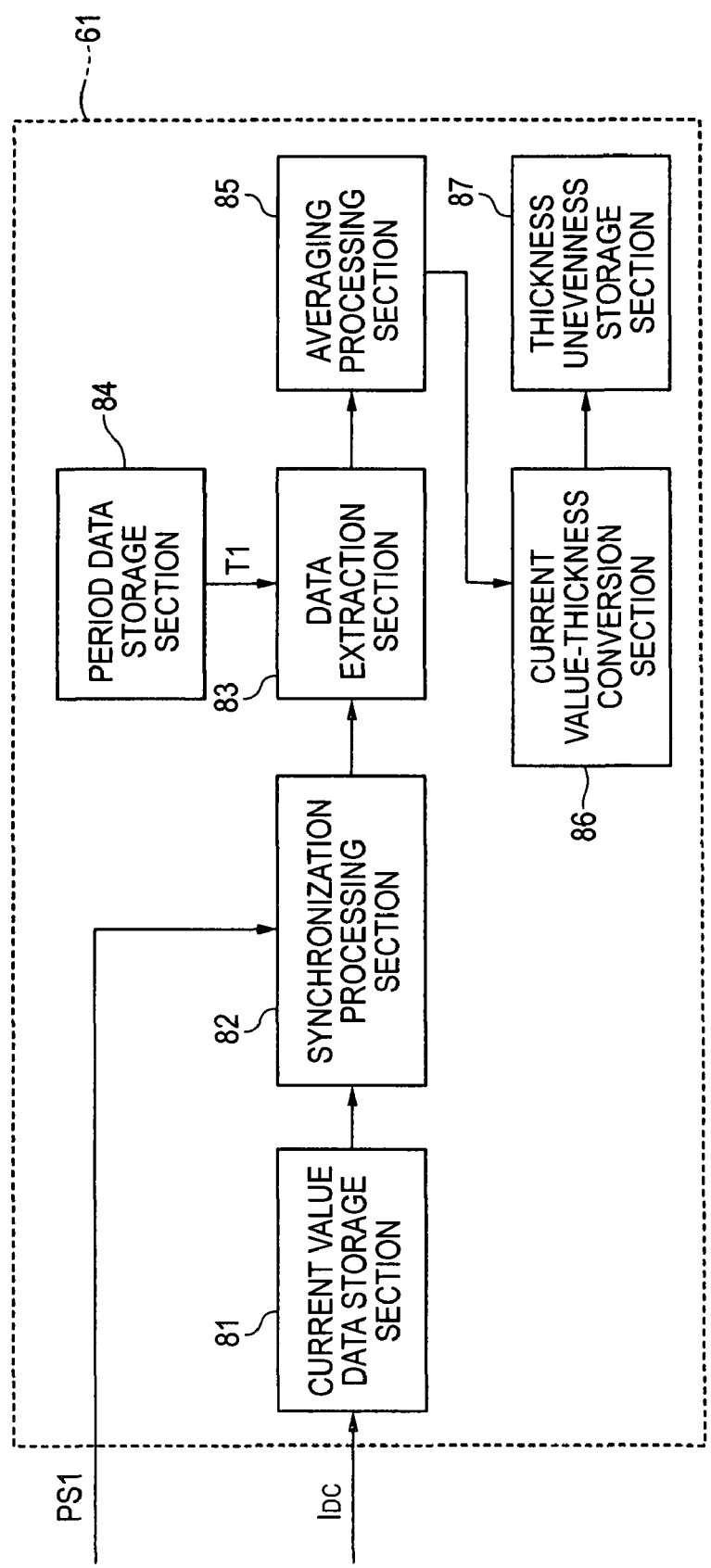
FIG. 19 is a block diagram to show a thickness variation detection section.

FIG. 19 is a block diagram to show the configuration of the thickness variation detection section 61 shown in FIG. 18.

The thickness variation detection section 61 includes a current value data storage section (memory) 81, a synchronization processing section 82, a data extraction section 83, a period data storage section 84, and an averaging processing section 85.

Figure 20:
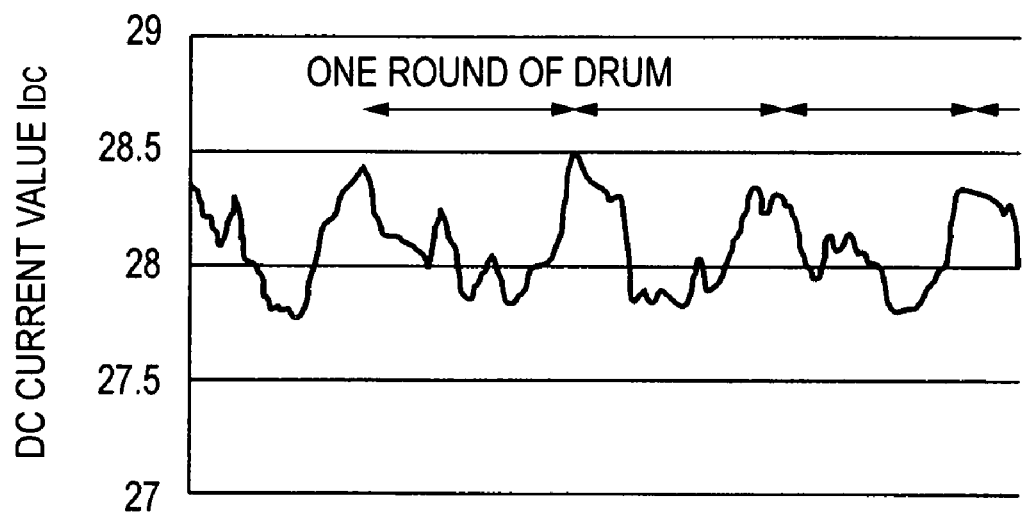
FIG. 20 is a graph to show the thickness of a photoconductor layer.
Figure 20:
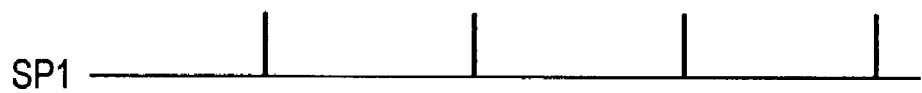

The current value data storage section 81 stores data of DC current value $I_{DC}$ detected by a current detection circuit 60 as current value data (digital data) arranged in the rotation direction of the photoconductor drum 15. The synchronization processing section 82 synchronizes the current value data $I_{DC}$ read from the current value data storage section 81 and the phase signal PS1 input from the phase detection sensor 71 with each other in synchronization with each other. That is, it determines which position of the current value data corresponds to the formation part of the mark M1 in the photoconductor drum 15 as shown in FIG. 20.

The period data storage section 84 stores the period of one revolution of the photoconductor drum 15 (which will be hereinafter referred to as first period T1). The first period T1 is predetermined in response to the outer diameter and the rotation speed of the photoconductor drum 15. The data extraction section 83 reads the first period T1 stored in the period data storage section 84. The data extraction section 83 extracts current value data in a plurality of rounds (a plurality of first periods T1) of the photoconductor drum 15 for each first period T1 from the current value data already subjected to the synchronization processing input from the synchronization processing section 82.

Figure 21:
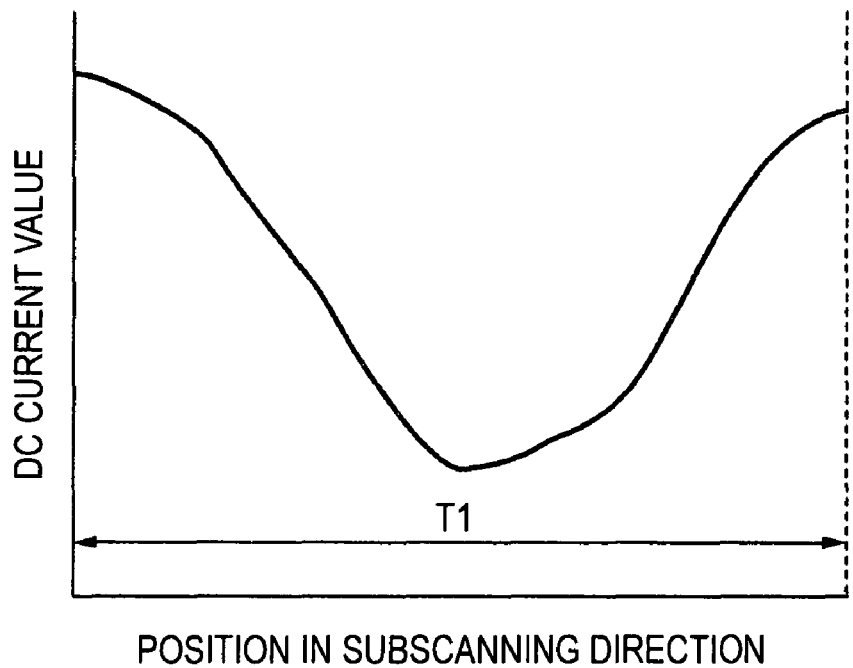
FIG. 21 is graphs to show the value of DC current flowing into a charging roll and the thickness of the photoconductor layer.
Figure 21:
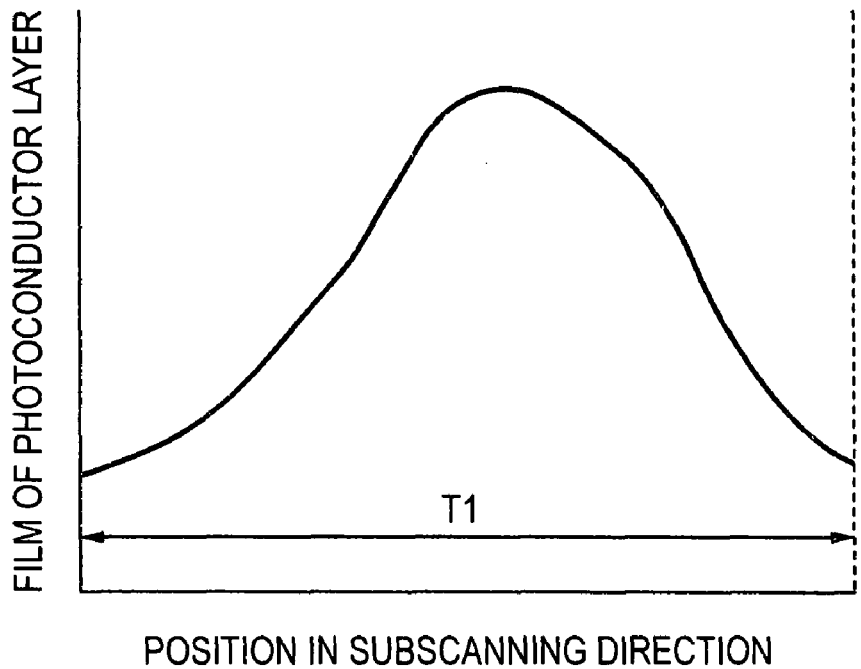

The averaging processing section 85 averages a plurality of pieces of current value data input from the data extraction section 83 for each identical part on the photoconductor drum 15. A current value-thickness conversion section 86 converts the current value data averaged by the averaging processing section 85 into thickness data as shown in FIG. 21. The current value data averaged by the averaging processing section 85 is data provided by averaging the current value data at each position on the photoconductor drum 15 over a plurality of periods of the photoconductor drum 15 rather than averaged data in one round of the photoconductor drum 15.

A thickness unevenness storage section 87 stores thickness unevenness corresponding to one period along the rotation direction of the photoconductor drum 15 in response to the thickness data provided by the current value-thickness conversion section 86 as shown in FIG. 21(b).

A gradation correction data computation section 88 computes gradation correction data in response to the data of the thickness unevenness of the photoconductor layer 52 input from the thickness unevenness storage section 87 of the thickness variation detection section 61, stores the result as gradation correction data LC1, and outputs the data at a timing. The gradation correction data LC1 stored in the gradation correction data computation section 88 is output upon reception of a request from the gradation correction section 67.

Figure 22:
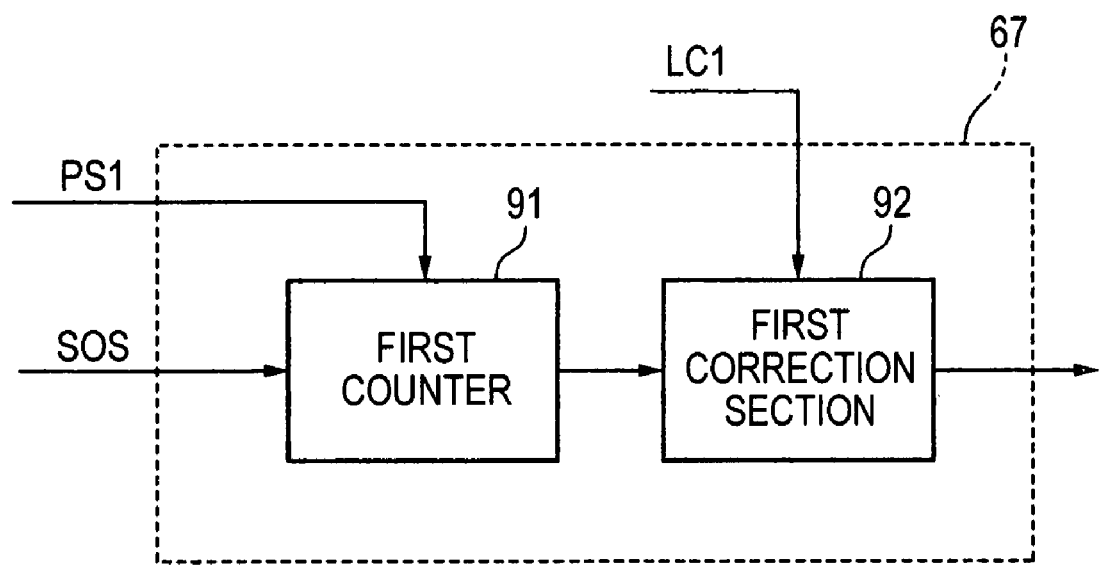
FIG. 22 is a block diagram to show a gradation correction section, Wherein 13Y, 13M, 13C, 13K each represents an image formation unit, 14 represents a ROS, 15 represents a photoconductor drum, 16 represents a charging roll, 17 represents a developing unit, 60 represents a current detection circuit, 61 represents a thickness variation detection section, 67 represents a gradation correction section, and 110 represents a density correction section.

FIG. 22 is a diagram to describe the configuration of the gradation correction section 67 in the density correction section 110 shown in FIG. 18. The gradation correction section 67 as a controller includes a first counter 91 and a first correction section 92.

The first counter 91 counts the number of SOS signals input from an SOS sensor 108 (see FIG. 2). The phase signal PS1 is input from the phase detection sensor 71 (see FIG. 18) to the first counter 91. Whenever the phase signal PS1 is input to the first counter 91, the count of the first counter 91 (called first count value) is reset. The first correction section 92 references the gradation correction data LC1 read from the gradation correction data computation section 88 (see FIG. 18) and outputs the first correction value responsive to the first count value input from the first counter 91.

In the described configuration, the full-color printer according to the second embodiment operates as follows:

In the second embodiment, the thickness detection operation of the photoconductor drum 15 is performed at a timing before the print operation of an image as shown in FIG. 18. The thickness detection operation is executed at a timing, for example, when power of the printer is turned on, after completion of the print operation of the number of sheets, etc.

The thickness detection operation is performed by rotating the photoconductor drum 15, charging the surface of the photoconductor drum 15 to a potential by a charging roll 16, and detecting the DC current $I_{DC}$ flowing into the charging roll 16 is detected immediately by the current detection circuit 60 as shown in FIG. 18. At this time, image exposure and developing process are not performed on the surface of the photoconductor drum 15.

The DC current value $I_{DC}$ flowing into the charging roll 16 detected by the current detection circuit 60 is input to the thickness variation detection section 61 as shown in FIG. 18 and is stored in the current value data storage section 81 of the thickness variation detection section 61 as digital data. Next, the synchronization processing section 82 synchronizes the current value data stored in the current value data storage section 81 in response to the phase signal PS1 input from the phase detection sensor 71 (see FIG. 18) and the data extraction section 83 extracts the current value data stored in the current value data storage section 81 as shown in FIG. 20 every period of the photoconductor drum 15 and then the averaging processing section 85 averages the current value for each position along the circumferential direction of the photoconductor drum 15 as shown in FIG. 21(*a*). The current value for each position averaged by the averaging processing section 85 is converted into thickness data of the photoconductor layer 52 by the current value-thickness conversion section 86 and the thickness data is stored in the thickness unevenness storage section 87. The averaging processing section 85 averages the current value for each position along the circumferential direction of the photoconductor drum 15, whereby the detection accuracy of the thickness based on the current value improves.

The gradation correction data computation section 88 computes gradation correction data in response to the data of thickness unevenness of the photoconductor layer 52 input from the thickness unevenness storage section 87 of the thickness variation detection section 61 and stores the result as gradation correction data LC1.

Then, in the full-color printer, as shown in FIG. 2, to print a full-color image, etc., the surfaces of the photoconductor drums 15 are charged to a potential by the charging rolls 16 in image formation sections 13Y, 13M, 13C, and 13K of colors of yellow (Y), magenta (M), cyan (C), and black (K) and then image exposure corresponding to the color image data is executed on the surfaces of the photoconductor drums 15 by ROSs 14Y, 14M, 14C, and 14K to form electrostatic latent images and the electrostatic latent images formed on the photoconductor drums 15 are visualized in corresponding color toners by developing units 17 to form toner images. The toner images of colors of yellow (Y), magenta (M), cyan (C), and black (K) formed on the photoconductor drums 15 are multiply transferred onto an intermediate transfer belt 25 and then are secondarily transferred from the intermediate transfer belt 25 in batch onto record paper 35 by a secondary transfer roll 34 and are fixed by a fuser 38 to form a full-color image.

At the time, in the full-color printer, the phase detection sensor 71 detects the phase of the photoconductor drum 15 as shown in FIG. 18 and outputs a phase signal PS1. The phase signal PS1 output from the phase detection sensor 71 is input to the first counter 91 as shown in FIG. 22.

The first counter 91 counts the number of SOS signals input from the SOS sensor 108 (see FIG. 2). The phase signal PS1 is input to the first counter 91 from the phase detection sensor 71 (see FIG. 18). Whenever the phase signal PS1 is input to the first counter 91, the count of the first counter 91 (called first count value) is reset. The first correction section 92 references the gradation correction data LC1 read from the gradation correction data computation section 88 (see FIG. 18) and outputs the first correction value responsive to the first count value input from the first counter 91. The ROS 14 as an exposure unit executes image exposure for the surface of the photoconductor drum 15 in a state in which the gradation data is corrected in response to the correction with the first correction value.

Consequently, if the thickness of the photoconductor layer 52 of the photoconductor drum 15 contains thickness unevenness along the rotation direction of the photoconductor drum 15, the exposure amount of the image exposure is controlled at a position along the rotation direction of the photoconductor drum 15 in response to the thickness unevenness of the photoconductor layer 52, whereby inconsistencies in density caused by thickness unevenness of the photoconductor layer 52 are suppressed.

Other components and functions are similar to those of the first embodiment and will not be discussed again.

In the description of the embodiment, partial thickness unevenness of the photoconductor layer 52 in the photoconductor drum 15 appears as surface potential unevenness of the photoconductor drum 15 caused by the charging rolls 16. In addition, if inconsistencies in density along the rotation direction of the photoconductor drum 15 are caused to occur as partial thickness unevenness of the photoconductor layer 52 in the photoconductor drum 15 affects the developing electric field in the developing unit 17 or the transfer electric field in primary transfer roll 26, the thickness variation detection section 61 may detect thickness unevenness corresponding to the rotation period of the developing roll or the primary transfer roll 26 and image exposure, etc., may be corrected in response to the detected thickness unevenness.

The invention can be applied not only to the full-color image formation apparatus, but also to a monochrome image formation apparatus, of course.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thickness variation detector of a photoconductor comprising:
    a current detection unit that detects values of current at which a charging unit charges plural positions of a surface of the photoconductor respectively while being in contact with the surface of the photoconductor;
    an average current calculation unit that calculates an average value of detected values of the current; and
    a thickness variation detection unit that detects a thickness unevenness along a rotation direction of the photoconductor based on differences between the detected values of the current and the average value.

2. The thickness variation detector as claimed in claim 1, wherein the thickness detection unit detects the thickness variation along the rotation of the photoconductor based on a thickness of the photoconductor, a DC current value detected by the current detection unit and an average value of the DC current value, the thickness of the photoconductor being calculated in accordance with the number of rotations of the photoconductor.

3. An image formation unit comprising:
- a photoconductor being rotated;
- a charging unit that charges a surface of the photoconductor in a state in which the charging unit is in contact with the surface of the photoconductor;
- a current detection unit that detects values of DC current at which a charging unit charges plural positions of a surface of the photoconductor respectively while being in contact with the surface of the photoconductor;
- an average current calculation unit that calculates an average value of detected values of the current;
- a thickness variation detection unit that detects a thickness unevenness along a rotation direction of the photoconductor based on differences between the detected values of the DC current and the average value; and
- a controller that controls an image formation condition in response to a detection result of the thickness variation detection unit.

4. The image formation unit as claimed in claim 3, wherein the controller controls an exposure amount to the photoconductor in response to a detection value of the thickness variation detection unit.

5. The image formation unit as claimed in claim 3, wherein the controller prohibits image formation operation when a detection value of the thickness variation detection unit exceeds a threshold value.

6. An image formation apparatus comprising:
- a photoconductor being rotated;
- a charging unit that charges a surface of the photoconductor in a state in which the charging unit is in contact with the surface of the photoconductor;
- a bias voltage application unit that applies a DC bias voltage, on which an AC voltage is superposed, to the charging unit;
- a current detection unit that detects values of DC current at which a charging unit charges plural positions of a surface of the photoconductor respectively while being in contact with the surface of the photoconductor;
- an average current calculation unit that calculates an average value of detected values of the current;
- a thickness variation detection unit that detects a thickness unevenness along a rotation direction of the photoconductor based on differences between the detected values of the DC current and the average value; and
- a controller that controls an image formation condition in response to a detection result of the thickness variation detection unit.

7. The image formation apparatus as claimed in claim 6, wherein the controller controls an exposure amount to the photoconductor in response to a detection value of the thickness variation detection unit.

8. The image formation apparatus as claimed in claim 6, wherein the controller prohibits image formation operation when a detection value of the thickness variation detection unit exceeds a threshold value.

9. The image formation apparatus as claimed in claim 6, wherein the thickness variation detection unit immediately detects a partial thickness variation along the rotation direction of the photoconductor based on the value of DC current.

10. The image formation apparatus as claimed in claim 6, wherein the thickness variation detection unit detects the thickness variation along the rotation direction of the photoconductor based on the value of DC current previously detected by the current detection unit and stores the thickness variation in a memory.

11. A method for detecting a thickness variation of a photoconductor comprising:
- detecting values of current at which a charging unit charges plural position of a surface of the photoconductor respectively while being in contact with the surface of the photoconductor;
- calculating an average value of detected values of the current at an average current calculation unit; and
- detecting a thickness unevenness along a rotation direction of the photoconductor based on differences between the detected values of the current and the average value.

* * * * *